INVENTOR.
James B. Bamberg,
BY
John H. Leonard,
his ATTORNEY.

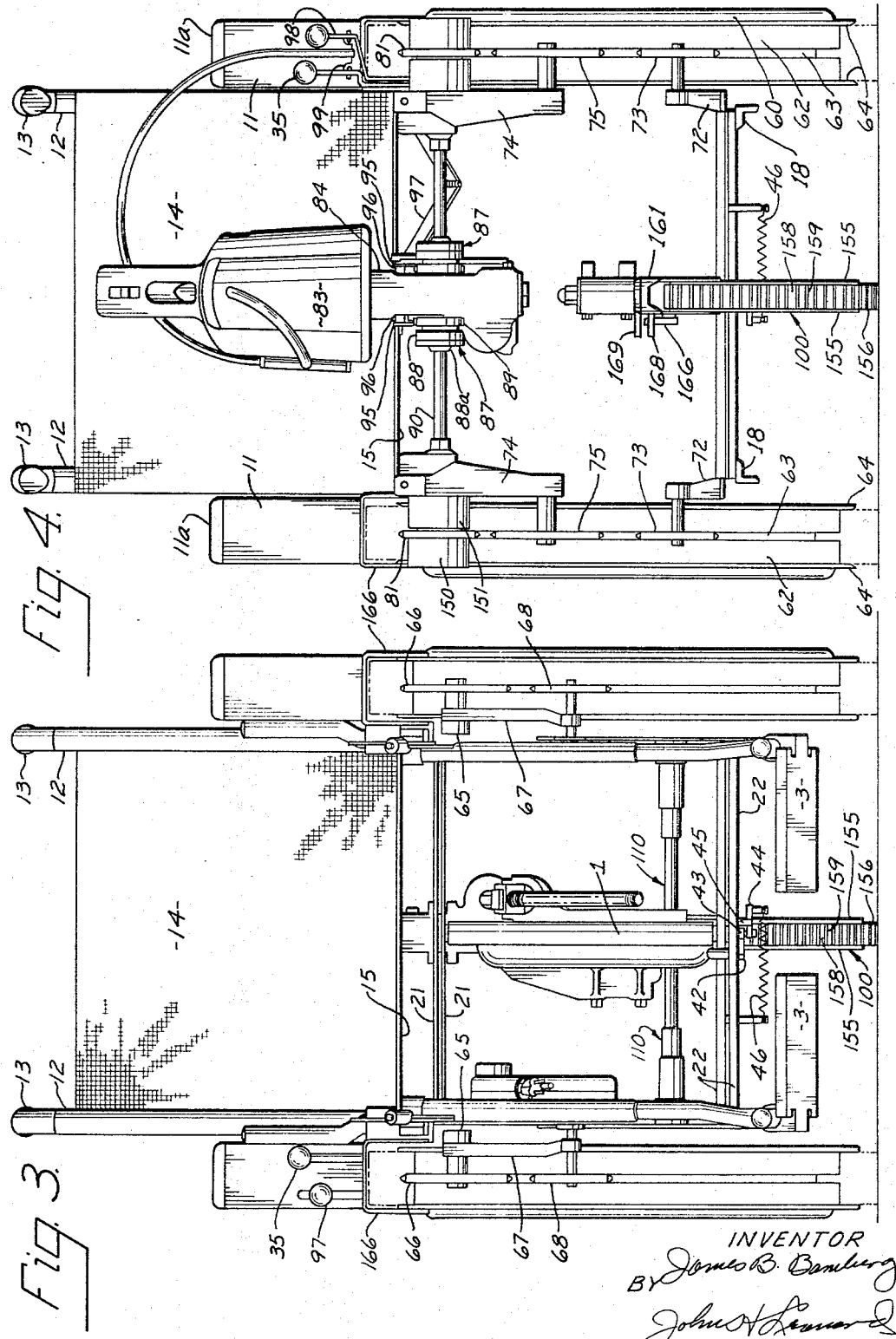

Dec. 20, 1966 J. B. BAMBERG 3,292,722
WHEEL CHAIR FOR OPERATION ON GROUND
AND STAIRS SELECTIVELY
Filed March 17, 1965 13 Sheets-Sheet 4

INVENTOR.
James B. Bamberg,
BY
John H. Leonard
his ATTORNEY.

Dec. 20, 1966  J. B. BAMBERG  3,292,722
WHEEL CHAIR FOR OPERATION ON GROUND
AND STAIRS SELECTIVELY
Filed March 17, 1965

INVENTOR
James B. Bamberg,
BY
John H. Leonard,
his ATTORNEY.

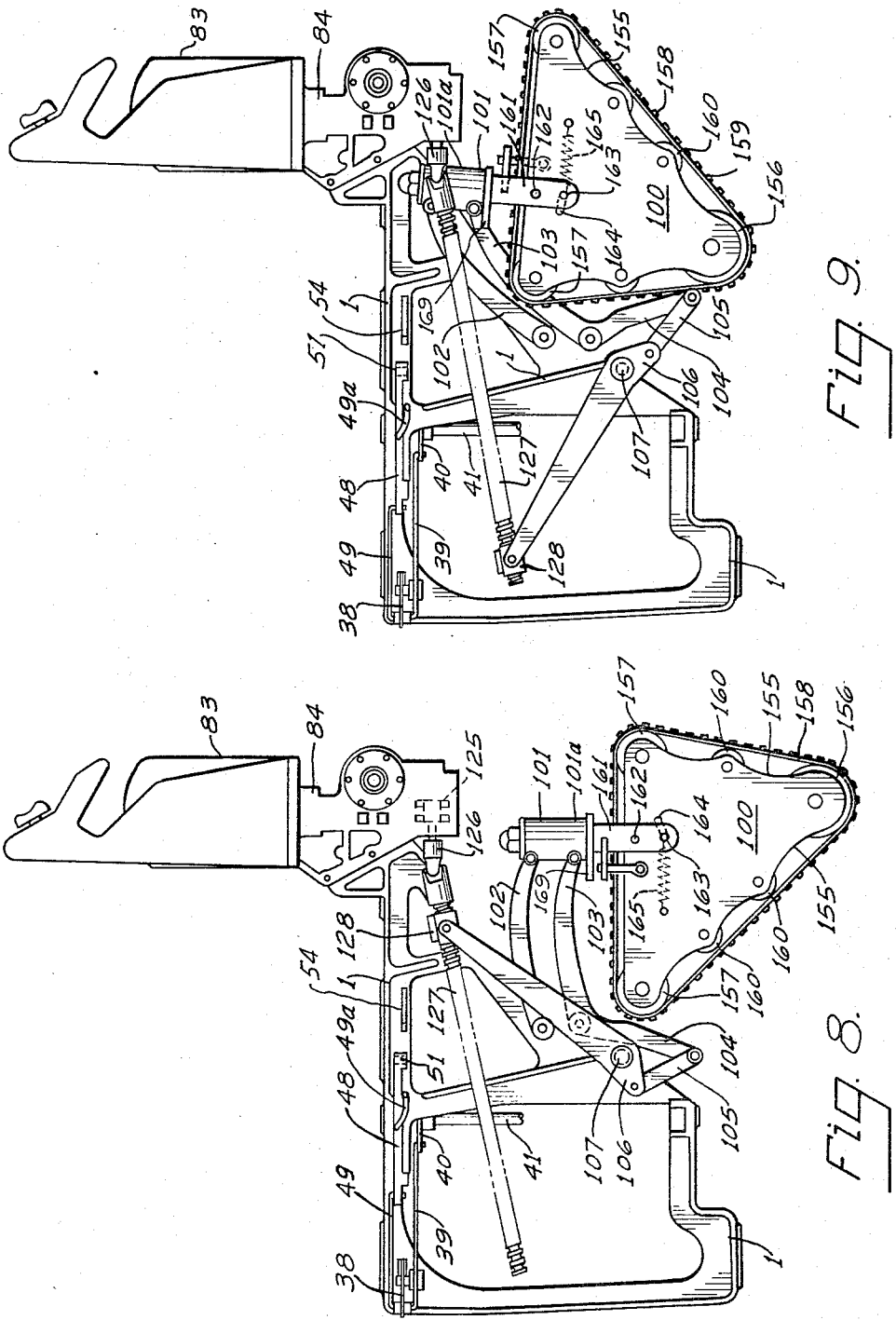

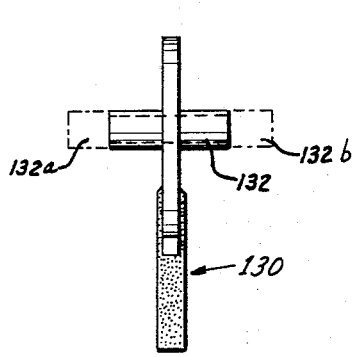
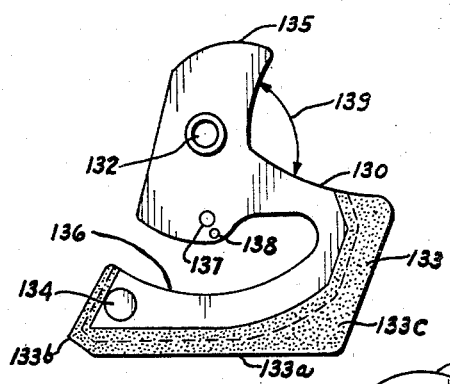
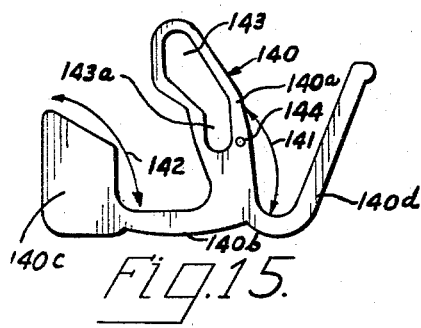
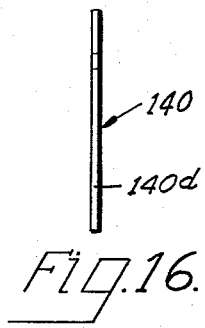
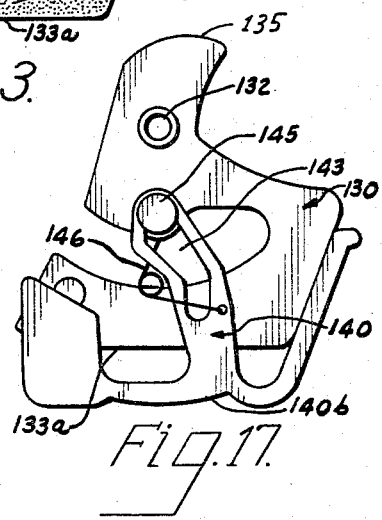
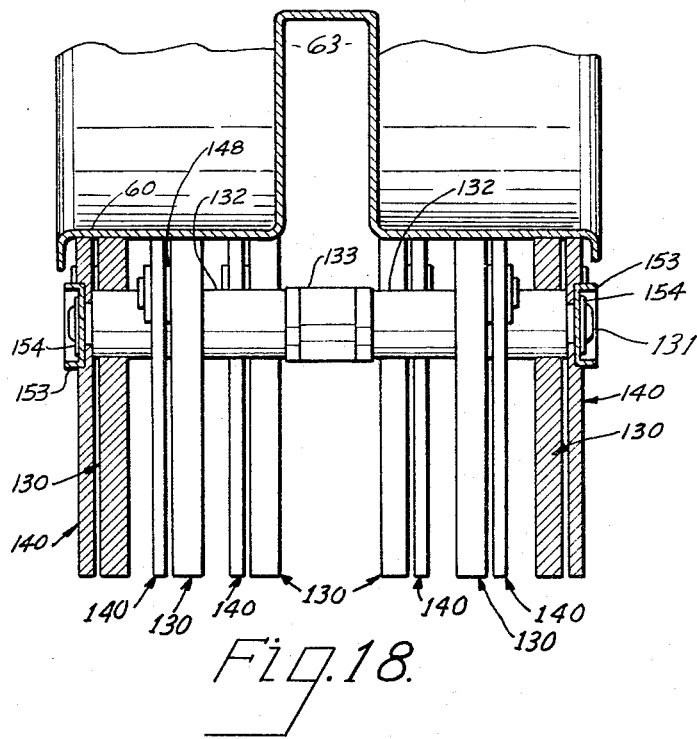

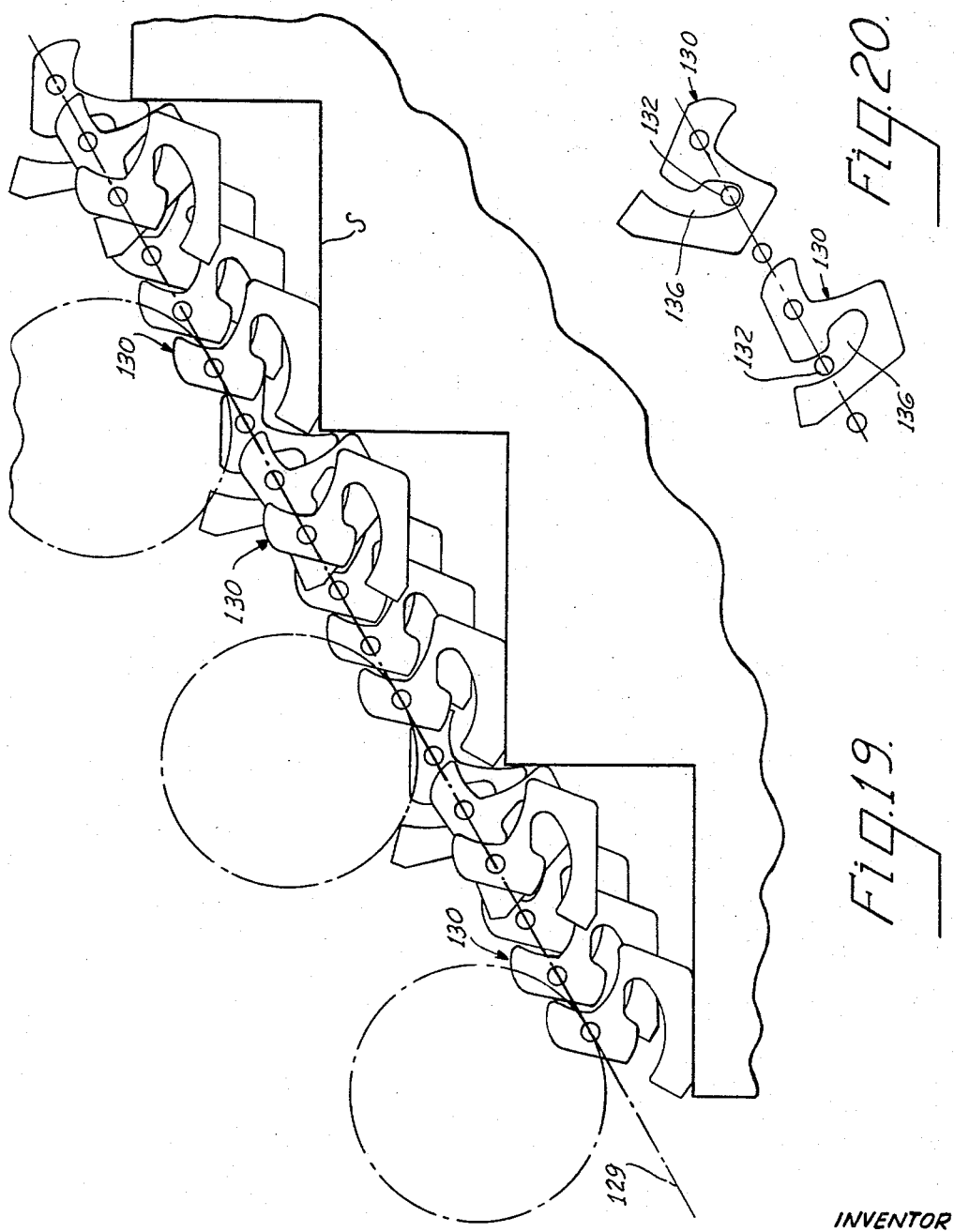

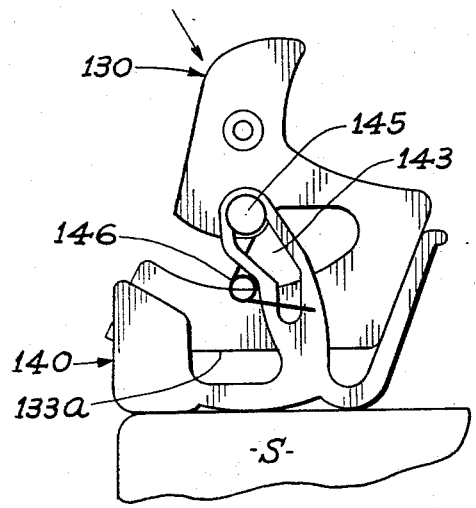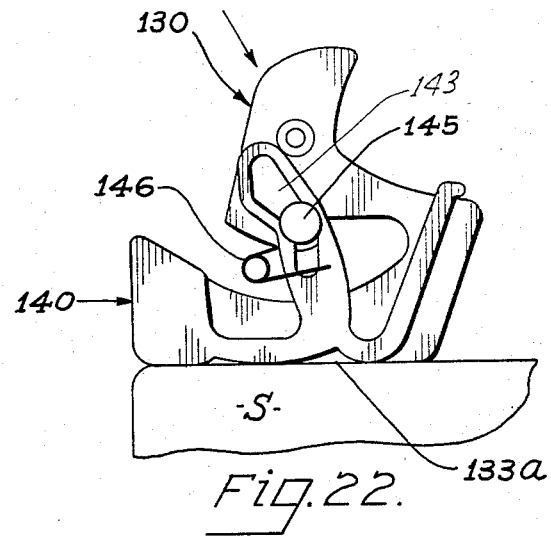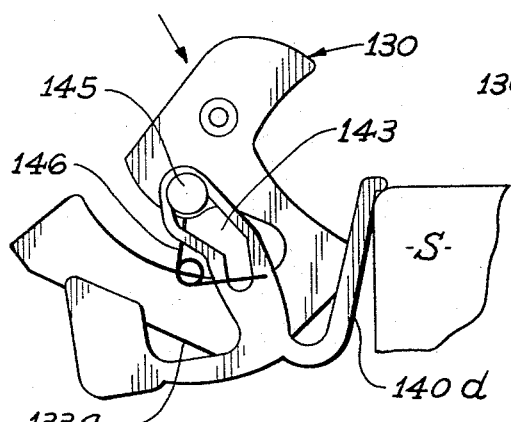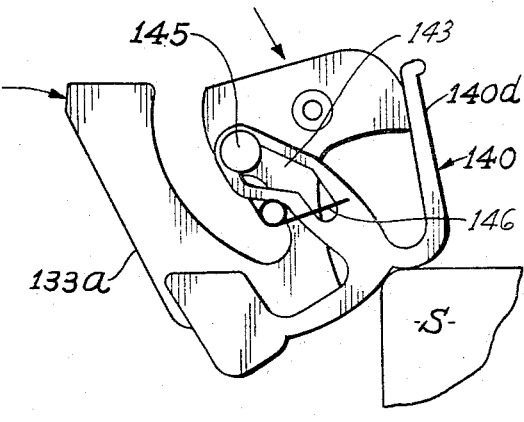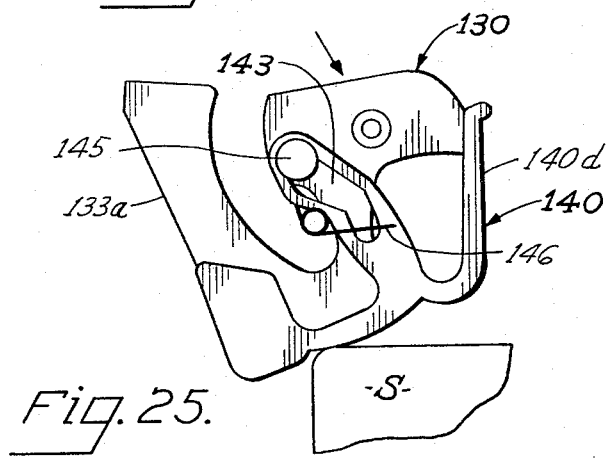

Dec. 20, 1966    J. B. BAMBERG    3,292,722
WHEEL CHAIR FOR OPERATION ON GROUND
AND STAIRS SELECTIVELY
Filed March 17, 1965    13 Sheets-Sheet 12

INVENTOR
James B. Bamberg,
BY
John H. Leonard,
his ATTORNEY.

Dec. 20, 1966  J. B. BAMBERG  3,292,722
WHEEL CHAIR FOR OPERATION ON GROUND
AND STAIRS SELECTIVELY
Filed March 17, 1965  13 Sheets-Sheet 13

INVENTOR.
James B. Bamberg,
BY
his ATTORNEY.

United States Patent Office 3,292,722
Patented Dec. 20, 1966

3,292,722
WHEEL CHAIR FOR OPERATION ON GROUND AND STAIRS SELECTIVELY
James B. Bamberg, Clearwater, Fla., assignor to Ibex Corporation, Clearwater, Fla., a corporation of Florida
Filed Mar. 17, 1965, Ser. No. 440,418
21 Claims. (Cl. 180—9.24)

This invention relates to a wheel chair for handicapped persons and particularly to a wheel chair capable of selective operation for travelling on level surfaces and for ascending and descending stairs.

One of the principal objects of the present invention is to provide a wheel chair which is power driven for ascending and descending stairs and which performs these functions by lifting itself and its occupant by direct downward thrusts applied on the upwardly facing tread surfaces of a plurality of stair treads concurrently, as distinguished from crawling up and down stairs by forces applied in a direction parallel to the pitch line or rise of the stairs against the forward margins of the stair treads, or otherwise.

Correlative objects are to provide a wheel chair which combines these capabilities with the capabilities of being operated on the ground in the normal manner by hand or, if desired, by power; of being partially collapsed laterally while occupied so as to be capable of passing through narrow passageways and of being maneuvered in tight spaces; and of being operated in fully extended condition or partially collapsed condition, selectively, while travelling along a floor surface or while ascending and descending stairs.

Another object is to provide a wheel chair which is readily dirigible for negotiating turns and curves, and which can be collapsed and maneuvered easily through the doorway of a passenger automobile into the rear seating compartment thereof.

Specifically, important features reside in the dual endless tracks which may be power driven in unison or hand driven independently of each other, selectively; the endless track caster; the means for retracting the caster to an idle position for stair travel and for extending it to an operating position for ground travel; the structure for manipulating the tracks so as to increase their effective length in the direction of travel for stair travel; the track arrangement whereby a plurality of load supporting feet and trippers on the tracks are readily positionable to provide, selectively, in operating effect, arcuate wheel tires for ground operation and individual elevating feet for ascending and descending stairs; the manner of mounting the feet so that the principal resistance to motion of the chair while ascending or descending is vertical and caused or resisted by gravity, the resistance to horizontal motion being minimal and merely incidental; the foot arrangement whereby the feet are constrained to full load bearing engagement with stair treads so as to prevent slippage off the stair treads, and whereby the feet function so that the steeper the stairs, the more directly downwardly they apply their lifting forces, as compared to other designs which depend upon friction, rather than direct lift, to ascend and descend stairs and, therefore, function with decreasing efficiency in relation to increasing steepness of the stairs; the foot and tripper mechanism whereby effective positioning of the feet on the upper surfaces of the stair treads is obtained despite the wide variation in height of risers and width of treads of stairs; the provision of tripper soles of almost rigid, but somewhat resilient material, such as urethane elastomers, so that the tripper soles are stiff enough for their primary function, yet are flexible enough to tolerate abuse and creep properly when the chair is negotiating turns; and the manner in which the tracks are supported for limited undulation to assure better cooperation of the feet with stair treads and to afford limited dirigibility of the chair by lateral shifting of the weight of the occupant.

Other objects and advantages will become apparent from the following description of a preferred embodiment of my invention wherein reference is made to the drawings in which:

FIG. 3 is a front elevation of the chair with the parts positioned for ground operation, as in FIG. 2; some parts being omitted for clarity;

FIG. 4 is a rear view of the chair with the parts positioned for ground operation, some parts, particularly portions of the frame and some of the bogie wheels and arms being omitted for clearness in illustration;

FIG. 8 is a fragmentary side elevation of the chair, showing the main control frame with a caster assembly in lowered ground engaging condition, parts of the structure being omitted for clearness in illustration;

FIG. 9 is a fragmentary side elevation similar to FIG. 8, but showing the caster in the raised idle or stair climbing position;

FIG. 13 is an enlarged side elevation of one of the feet used on the endless tracks of the present invention;

FIG. 14 is a left end elevation of the foot illustrated in FIG. 13;

FIG. 15 is a side elevation of a foot tripper used in the present invention;

FIG. 16 is a right end elevation of the tripper illustrated in FIG. 15;

FIG. 17 is a side elevation showing a foot and tripper in free hanging position.

FIG. 18 is an enlarged fragmentary cross sectional view of one of the wheels of the chair, showing the relation between the feet, trippers, endless track, and wheel, and is taken on the line 18—18 in FIGS. 2 and 32, respectively;

FIG. 19 is a diagrammatic side elevation showing the manner in which the feet of the track cooperate with the stairs;

FIG. 20 is a diagrammatic side elevation showing notches in the feet by which clearance is provided between the pivots of one foot and the foot adjacent thereto at the same side of the track;

FIG. 21 is a side elevation of a foot and tripper showing the initial engagement of the tripper and upper face of a stair tread during one manner of their approach theretoward;

FIG. 22 is a side elevation similar to FIG. 21 showing the foot and tripper in full contact with the upper face of the tread;

FIG. 23 is a side elevation of a foot and tripper showing the initial engagement of the tripper with a stair tread when approaching the tread in another manner;

FIG. 24 is a side elevation similar to FIG. 22 showing the initial engagement of the tripper during another manner of approach of a foot and tripper to a stair tread;

FIG. 25 is a side elevation, similar to FIG. 22, showing the initial engagement of a tripper and stair tread during another typical approach of a foot and tripper to a stair tread;

Figure 1:
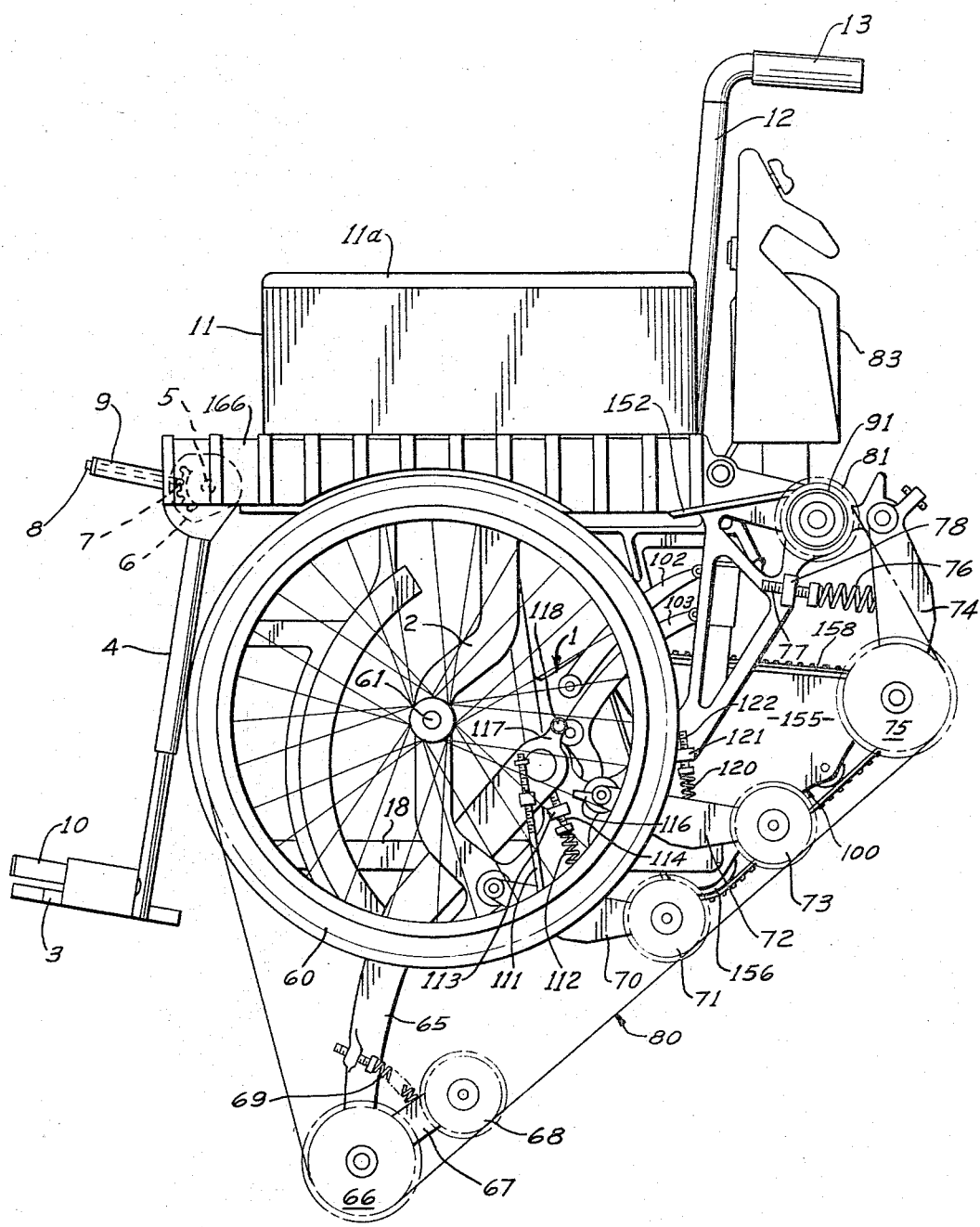
FIG. 1 is a side elevation of a wheel chair embodying the principles of the present invention and showing the parts positioned for stair climbing.

Referring to the drawings, the chair comprises a main central frame 1 to which lateral side frames 2 are connected for movement toward and away from the central frame to retracted and extended positions so that the chair can be folded or collapsed transversely, as will later be described.

Suitable foot rests 3 are provided near the front end of the side frames 2. The foot rests are supported by telescopic legs 4 which are pivotally connected by the pivots 5 to the upper forward portions of the side frames 2 respectively, for swinging forwardly and rearwardly of the chair. The legs 4 may be locked in selected positions by notched locking plates 6 on the side frames engageable by spring seated detents 7 which are releasable by suitable detent buttons 8 carried on positioning handles 9 connected to the legs 4. If desired suitable bumpers 10 may be provided on the legs, or adjacent the foot rests to protect the occupant and household furnishings.

Each side frame 2 is provided with an open top hollow arm 11 covered by an arm rest 11a.

Connected to the side frames 2 at the rear are generally upright seat back supporting tubes 12 into the upper ends of which the downturned forward ends of push handles 13 are inserted respectively, the handles being supported thereby for rotation to selected positions about the axes of the tube 12 so as to gain clearance when the chair is being manipulated in close quarters. The tubes 12 support a flexible fabric seat back 14. A flexible fabric seat 15 is connected at its lateral margins to the upper portions of the side frames 2.

Each of the side frames 2 is rigid and self-supporting and carries an upper longitudinal sill 17 and lower longitudinal sill 18. In order to connect the side frames 2 to each other and to the central main frame 1, so that the side frames 2 can be moved toward each other to retracted or collapsed position and away from each other to extended or open position while being maintained at all times in parallelism and transverse alignment with each other upper folding braces 21a and 21b and lower folding braces 22a and 22b are provided. The companion folding braces are pivotally connected together at their longitudinal midportions for rocking about a common axis. The folding braces 21a and 21b carry pivots 23 at their outer ends, respectively. The folding braces 22a and 22b carry pivots 24 at their outer ends, respectively. The pivots 23 slide in slots 25 in the upper sills 17 and the pivots 24 slide in slots 26 in the lower sills 18, respectively.

Figure 6:
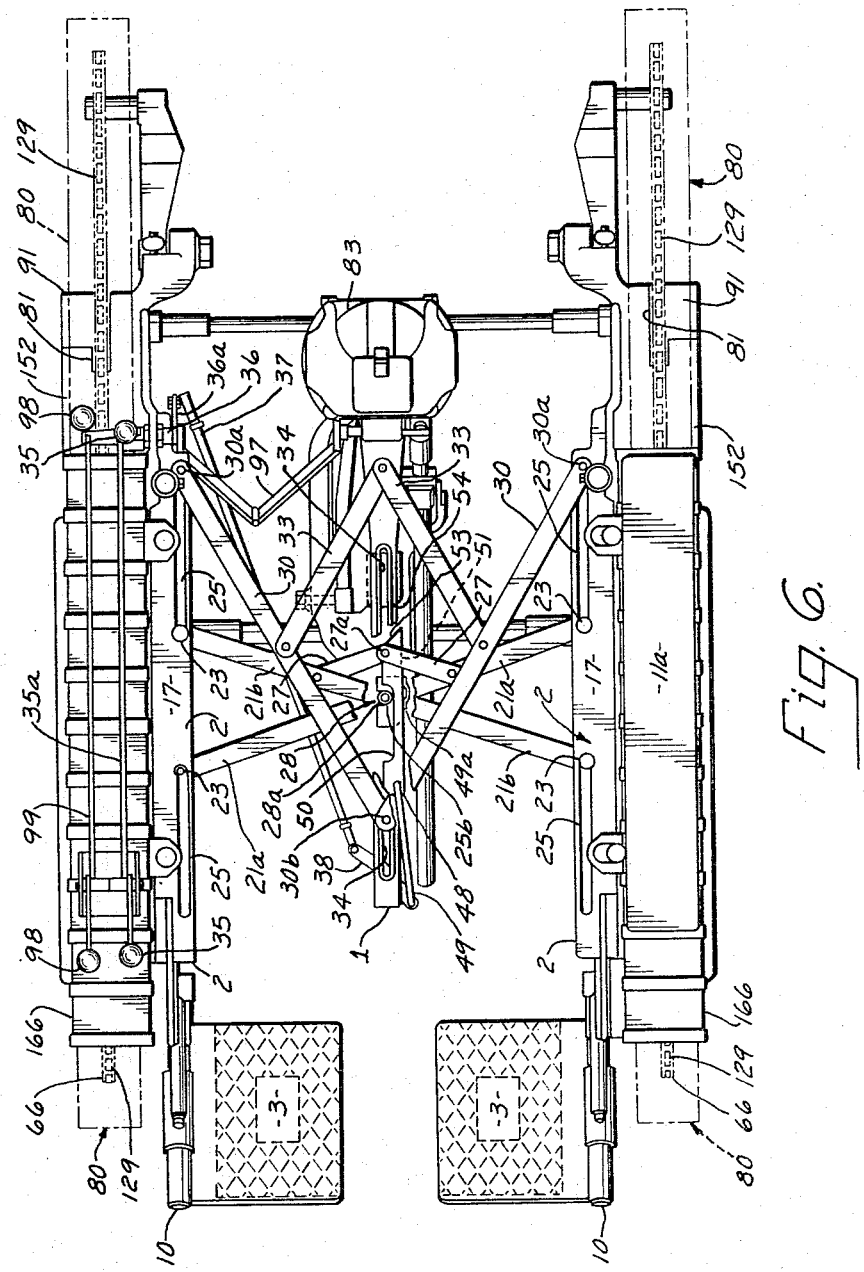
FIG. 6 is a top view of the chair, as illustrated in FIG. 2, with the parts positioned for ground operation, and showing the folding frame structure, some parts of the chair structure being omitted for clearness in illustration.

In order to assure that the angular movement of the folding brace 21a relative to the main frame, is at all times the same as the angular movement of the folding brace 21b the folding braces 21a and 21b are connected together by suitable toggle links 27 which are connected to each other by a pivot 27a. The pivot 27a is slidable in a slot in the main frame 1, as hereinafter described. The links 27 are pivotally connected at their outer ends to braces 21a and 21b, as illustrated in FIG. 6.

The upper brace 21a and lower brace 22a are connected for rocking in fixed relation to each other about a common pivotal axis, as also are the upper brace 21b and lower brace 22b. These connections are provided by a connector 28 comprising a tube 28a and coaxial tie shaft 28b extending therethrough. The tube 28a is fixedly connected to the braces 21a and 22a for rocking therewith and the shaft 28b is fixedly connected to the braces 21b and 22b for rocking therewith. The pivotal connections of the folding braces are coaxial with the tube 28a and shaft 28b. The upper braces 21a and 21b maintain the side frames in parallelism from front to rear, at the top. Correspondingly, the lower braces 22a and 22b maintain the side frames in parallelism, from front to rear at the bottom. The connector 28 synchronizes the upper and lower brace movements, thereby keeping the side frames in parellelism from top to bottom.

Upper thrust braces 30 are provided and are pivotally connected at their outer ends to the sills 17 by pivots 30a, respectively. They are pivotally connected together at their inner ends by a pivot 30b. Lower thrust braces 31 are provided and are connected at their outer ends to the sills 18 by pivots 31a and are pivotally connected together at their inner ends by a pivot 31b. The braces 30 and 31 prevent one side frame from moving ahead or lagging behind the other.

Thus the structure resists distortion or improper alignment due to twisting, rotational, or other forces.

The pivots 30b and 31b of the thrust braces 30 and 31 are guided in slots 34 in the main frame 1. Suitable alignment braces 33, to hold the center frame 1 in fixed fore and aft relationship to the side frames 2, are pivotally connected together and to the frame 1 at their inner ends and, at their outer ends, are pivotally connected to the braces 30, respectively.

In order to collapse the frame, suitable front and rear levers 35 are pivotally mounted on the side frames, respectively. The levers are connected together by a tie rod 35a so that both levers operate in unison. The rear lever 35 is connected to a rock shaft 36 which has a crank arm 36a. The arm 36a, in turn, is connected to a tie rod 37. The tie rod 37 is pivotally connected to one end of a rock lever 38 which, in turn, is pivotally connected on the main frame 1. The opposite end of the lever 38 is connected to a sector gear rod 39 which is connected to lever 40 integral with the upper end of a sector gear shaft 41. The sector gear shaft extends from near the top to near the bottom of the main frame and at its lower end it carries a sector gear 42. The sector gear 42 is in mesh with a toggle gear 43 pivotally mounted on the tie shaft 28b, so that rocking of the sector gear 42 rocks the gear 43. As mentioned, the upper brace 21a and lower brace 22a are parallel to each other and are connected in fixed position to the tube 28a so that they can rock therewith about its axis. The braces 21b and 22b are connected to the shaft 28b for rocking therewith about its axis.

Figure 7:
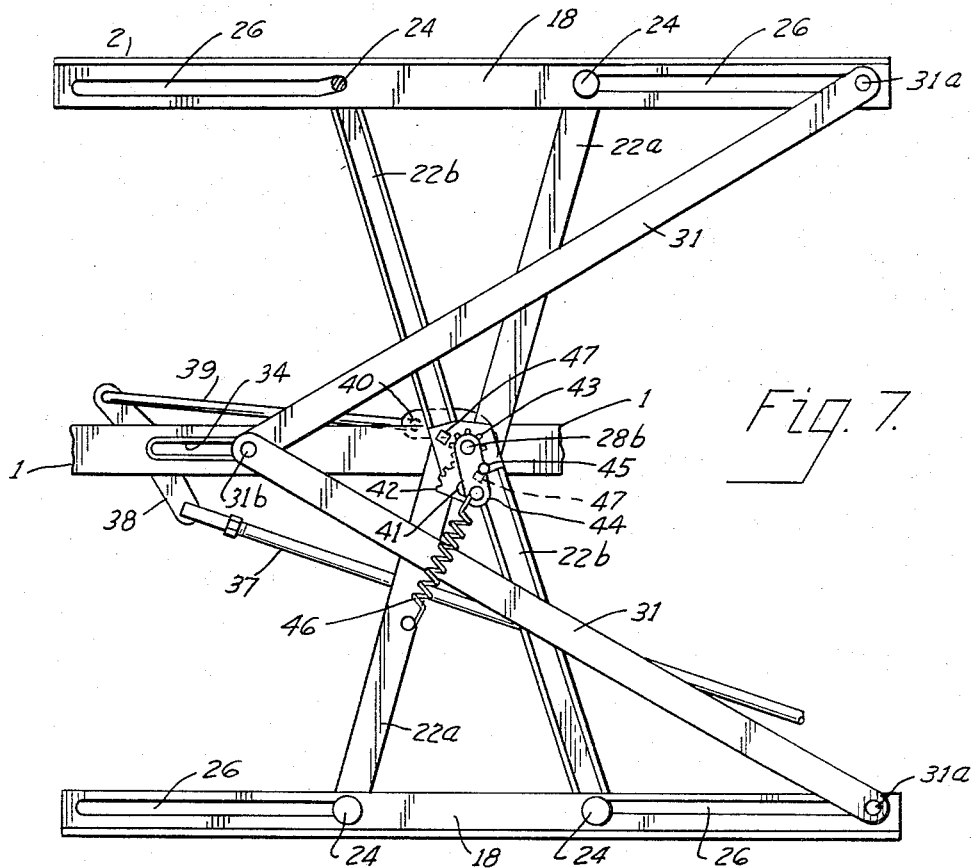
FIG. 7 is a fragmentary bottom plan view of the chair showing part of the folding frame structure illustrated in FIG. 6.

In order to assure the folding operation, a reversible toggle arm 44 is connected at its inner end to the gear 43 for rocking therewith about the axis of the shaft 28b. Near its outer end the arm 44 carries a stop pin 45. A reversible dead center toggle spring 46 is connected to the outer end of the arm 44 and to the folding brace 22a. The brace 22b carries two stops 47 which are spaced apart circumferentially of the shaft 28b. Upon rotation of the sector gear 42 in one direction, it rotates the gear 43, and thereby the toggle arm 44 until the toggle stop pin 45 engages one of the stops 47. Upon continued rotation, it thereby moves the braces 22a and 22b to the chair extending position, as illustrated in FIG. 7. The lower folding braces 22a and 22b, through the connector 28, move the upper folding braces 21a and 21b to a like position. The toggle arm 44 is permitted approximately one half turn with respect to the lower folding brace 22b. When in the clockwise position shown in FIG. 7, the spring 46, through the medium of the toggle arm 44, stop pins 45 and one of the stops 47, works in a manner so as to draw the folding braces 22a and 22b into the position shown. However, if the toggle arm 44 is rotated counterclockwise one half turn, so that stop pin 45 is bearing against the other stop 47, the spring works in a manner so as to rotate folding braces 22a and 22b in the opposite direction with respect to each other, thereby drawing the two sills 18 close together. Thus the spring, at the will of the user, will either extend or contract the folding frame. If desired, additional force either to extend or contract may be supplied by the user operating lever 35. Thereby, the spring assists in moving the folding braces to the extended position. Upon reverse movement, of lever 35, and thereby reversal of the direction of rotation of the sector gear 42, the lower braces 22a and 22b are moved toward contracting position. When the outer end of the arm 44 again passes the dead center position for the opening, the spring 46 assists in moving the folding braces to contracted position.

The spring 46 is of sufficient strength to move the side frames 2 against the sides of the occupant firmly but without causing uncomfortable pressure thereon. Since the seat is of fabric or loose material which slackens during movement of the side frames 2 toward each other, the upper braces 21a, 21b, and 30, and the links 27 and 33 are made of relatively thin, flat, resilient strip material, such as flat spring material. Preferably these are unflanged, but insofar as flanges may be provided on them, the flanges should be turned downwardly so that the braces and links can partially support the weight of the occupant without discomfort. The weight of the occupant thus assists somewhat in pulling the sides frames 2 toward each other. The lower braces 22a and 22b preferably have marginal flanges for sufficient rigidity for supporting the occupant and central main frame and transferring the load to the side frames.

It is to be noted that the slots 25 and 26 are not made straight at the ends in which the pivots are disposed in the extended position of side frames. The reason for not making the slots straight is because the weight of the occupant on the seat 15 tends to pull the two side frames 2 toward each other. If the slots were straight at these ends, the force would react upon the folding braces and tend to move them to retracted position. By making a small portion of the slots adjacent these ends essentially tangent to the swing of the folding brace pivots sliding therein, this reaction is eliminated.

It is noted that toggle spring 46 is sufficient to open the chair even while occupied until the side frames 2 are moved apart to an extent such that the sheet material of the seat 15 must be tensioned against the weight of the occupant. The spring 46 moves the side frames 2 to about an inch of fully extended position. Prior to completing the movement to fully extended position, the control lever 35 can be manipulated to rotate the reversible toggle against a stop on the lower folding brace 22b in such a manner as to assist the spring 46.

Figure 8A:
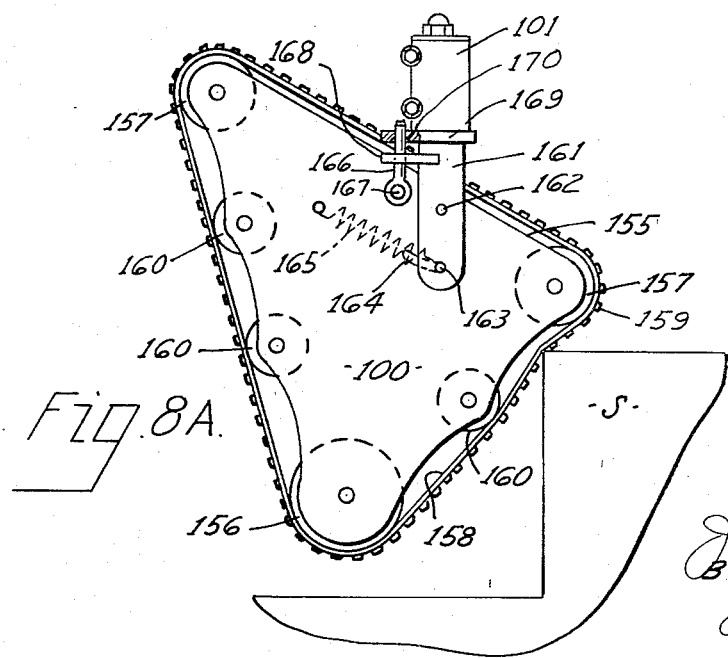
FIG. 8a is a view similar to FIG. 8, but showing the shift of the caster position when it is passing down a curb.

In order to move the folding braces to the fully extended position when the wheel chair is occupied, a toggle hook 48 is provided. The toggle hook 48 is mounted for sliding movement on the center frame longitudinally thereof and is driven by a rod 49 on the opposite side of the rock lever 38 from the rod 39. The toggle hook is biased by a spring 49a to the hooking position. The toggle hook 48 has an elongated cut-out portion 50 so as to clear the tube 28a of the connector 28, and on one side has a suitable notch 51. As best illustrated in FIGS. 6 and 8, in the final position in which the toggle hook 48 is urged by the spring 49a, the notch 51 engages the pivot 27a of the toggle links 27. Consequently, the toggle hook 48 can pull forward on the pivot 27a and, through the toggle links 27, force the folding braces 21a and 21b to fully extended position, which places pivots 23 and 24 within the tangential portions of slots 25 and 26.

When collapsing the folding braces, on the other hand, the lever 35 is moved downward and the toggle hook 48 forces pivot 27a in the rearward direction and thereby moving the folding braces through and off of their dead center position in the tangential slots in the collapsing direction. The toggle hook 48 has a release cam 53 at its rear end which engages a complementary cam release 54 on the main center frame. The cams are positioned so that when the lever 35 is moved in the folding or retracting direction, the toggle hook 48 moves rearwardly until the cam 53 engages the cam release 54 and releases the toggle hook notch 51 from the pivot 27a, the spring 49a permitting this movement and then restoring the toggle hook to position for reengagement with the pivot 27a when the toggle hook is again moved forwardly.

It will be seen that the toggle linkage provides a parallelogram consisting of toggle links 27 and portions of folding braces 21a and 21b. As the pivot 27a is moved toward the pivotal axis of the connector 28, the other angles of the parallelogram, represented by the joints between the toggle links and the folding braces, move farther apart. This also carries pivots 23 and the ends of the folding braces farther apart. The leverage action of a toggle is extremely nonlinear. As the side frames move farther apart, increasing leverage and force are required to stretch the seat. This coincides with the increasing leverage and force supplied by the toggle leverage action.

The fact that the reversing toggle arm 44 and gear 43 are permitted considerable rotational travel before the spring 46 passes over dead center and starts to bear in the opposite direction when the opposite stop comes into play, effectively gives the whole system considerable "backlash". After the spring has moved the chair to near full open position, the friction between the track and the ground will hold the chair from starting to refold. As the reversing toggle arm 44 is rotated away from its stop, the force of the spring is momentarily ineffective for the purpose of opening the chair. However, at the same time, the toggle hook 48 comes into play, and "picks up" the pivot 27a. As the toggle hook 48 advances, the reversible toggle arm 44 gradually and nearly "catches up" with its stop pin. At the fully opened position of the chair, the toggle hook has moved forward to its maximum limit, and the reversible toggle stop is at most just barely in contact with one of the folding brace stops. It is important, for this reason, that during assembly, the gears 42 and 43 be meshed in proper rotated positions.

Because the leverages of the reversible toggle system and toggle hook system far from coincide, it is necessary that means be provided to automatically select one or the other to keep the two systems from interfering with each other. The "backlash" of the reversible toggle takes it out of play when the toggle hook takes control.

Referring next to the supporting and propelling mechanism for the frame, hand wheels 60 are mounted on shafts 61 secured on the side frames 2. Each of the wheels, as best illustrated in FIG. 4, has a rim 62 with a drop center 63 and lateral flanges 64. The wheels do not directly engage the ground in load supporting relation but do so through the medium of endless tracks arranged one at each side of the chair, as will later be described.

Since the tracks and their mountings on the side frames are the same, only one track and its mountings on its associated side frame will be described in detail. Mounted on the side frame 2 for swinging movement about a horizontal axis is a front idler arm 65 which, at its outer end, carries a front idler sprocket 66 and also a bogie arm 67 which is swingable about the axis of the idler sprocket 66. The bogie arm 67 carries a bogie roller 68 which is disposed to the rear of the front idler sprocket when in the stair climbing position and below when in the level ground position. A biasing spring 69 is operatively interposed between the arms 65 and 67 and urge the bogie arm 67 to swing downwardly or clockwise about the axis of the front idler sprocket. Also mounted on the side frame 2, rearwardly from the arm 65, is a second bogie arm 70 which carries a bogie roller 71 and a third bogie arm 72 which carries a bogie roller 73. The arm 70 is pivotally connected at its front end to the side frame 2 for swinging in a vertical plane. The arm extends rearwardly from its pivot axis and the roller 71 is disposed rearwardly from the roller 68. The third bogie arm 72 is pivotally connected to the frame 2 at a point rearwardly from the pivoted axis of the bogie arm 70 and at an elevation thereabove. The bogie roller 73 is disposed rearwardly from the bogie roller 71 and at an elevation thereabove.

Mounted on the frame 2 rearwardly from, and at an elevation above the bogie arm 73, is a rear idler sprocket arm 74. The rear idler arm 74 is pivotally connected at its forward and upper end to the side frame 2 and carries at its lower end a rear idler sprocket 75. A biasing spring 76 is interposed between the frame 2 and the arm 74 so as to urge the arm 74 to swing counterclockwise and thus move the rear idler sprocket 75 in a direction generally rearwardly away from the wheel 60. A suitable adjusting bolt 77, in threaded engagement with an eye 78 on the frame 2, is provided for varying the compression of the spring 76. The spring automatically compensates for changes in load on the chair because, as the load increases, the spring is compressed and its value or force increases.

The endless track, indicated at 80, is provided for enabling the chair to travel on the ground or to ascend and descend staircases. The endless track 80 preferably is in the form of a chain and passes partially about the rim 62 of the wheel 60, thence around and beneath the front idler sprocket 66, beneath the bogie rollers 68, 71 and 73, in succession, and then around the rear sprocket 75. A drive sprocket 81 is mounted on the side frame 2 near the top thereof. The chain passes from the idler sprocket 75 into driven relation to the drive sprocket 81, and thence back over the rim of the wheel 60 to the front idler sprocket.

Figure 2:
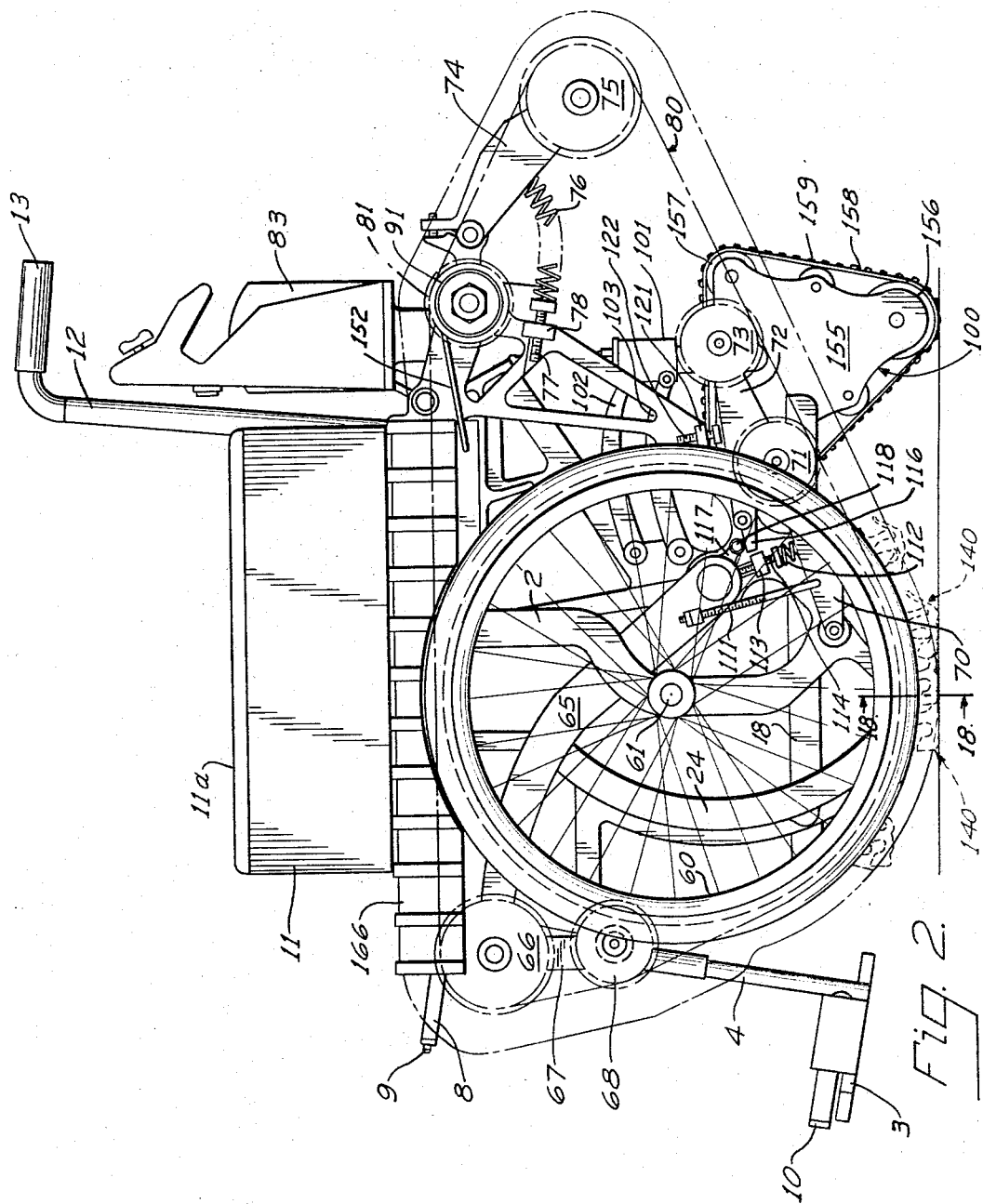
FIG. 2 is a side elevation of the chair of FIG. 1, but showing the parts positioned for ground operation.

The bogie rollers and sprockets are arranged so that the path of the chain can be changed from one, such as shown in FIG. 1, which is the stair climbing position, to one, such as illustrated in FIG. 2, which is the ground operating position. The drop center 63 of the wheels 60 are to accommodate the bogie rollers 68 and 71 so that they can be moved nearer to the axis of the wheel 60 in the ground operating position of the track 80, as illustrated in FIG. 2.

Referring first to the stair climbing position illustrated in FIG. 1, it is to be noted that the front idler arm 65 has been swung downwardly to a position wherein the front idler sprocket 66 and the front bogie roller 68 are disposed beneath the wheel 60 in spaced relation thereto. The arms 70 and 72 have been swung downwardly so that the wheels 71 and 73 are disposed a considerable distance rearwardly of the wheel 60 and in a lowered position. In these positions, the bogie rollers 68, 71 and 73 are in load bearing engagement with the track 80. The sprockets 66 and 75 also are in load bearing relation with the track 80, thus providing, in effect, additional rollers because idler 66 is extended away from wheel 60, as compared with the position shown in FIG. 2, and there is no change in the length of the track 80. The arm 74 has been swung clockwise about its pivotal axis on the frame 2 toward the wheel 60, thus compressing the spring 76, the track 80 engages the rim 62 of the wheel 60 primarily at its forward upper quadrant and is not in load bearing engagement therewith.

Under these conditions, the track 80 is under substantial tension due to the spring 76 and the wheel 60 is out of load bearing relation to the track and ground. The track while in this position, slopes upwardly, from the front to the rear of the frame, from a position below the bottom of the wheel 60 and forwardly from the wheel axis. Thus in negotiating a flight of stairs while in this condition, the weight of the chair and occupant are supported on the sprockets 66 and 75, the bogie rollers 68, 71 and 73, all of which are in load bearing relation to the track 80.

Due to the space between the rollers and sprockets and to the spring 76, a certain amount of undulation of the track 80 occurs, particularly when the resistance forces supporting the load are applied upwardly against the track 80 at locations between the bogie rollers.

With the parts in the positions described, the chair is in condition to ascend or descend a staircase, but since generally the occupant is unable to supply the necessary power for causing the chair to climb stars, a power supply is provided.

Figure 5:
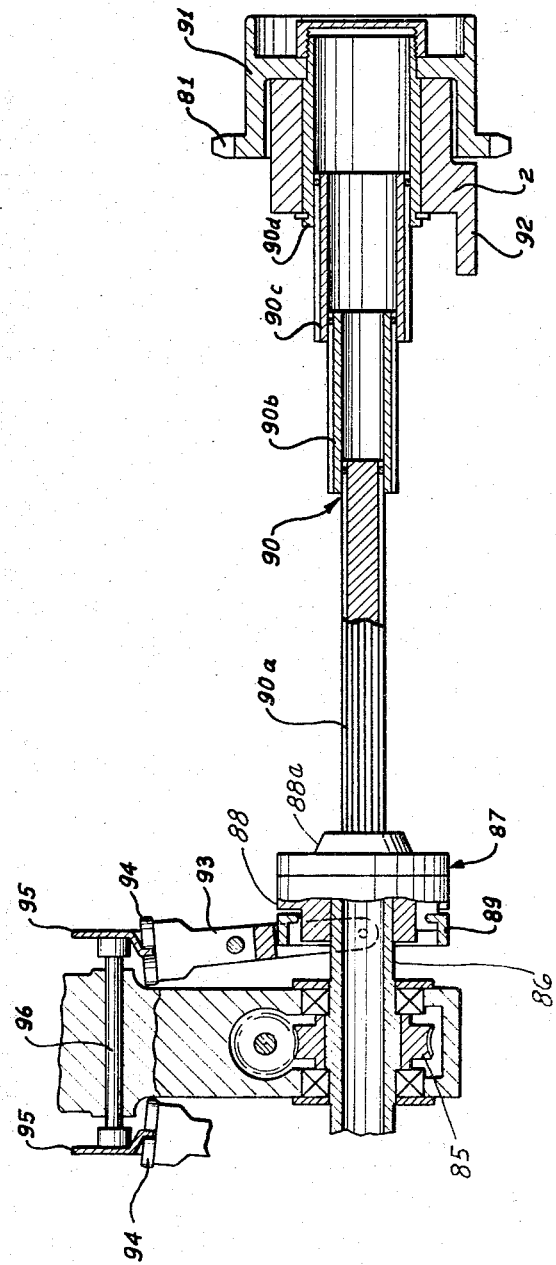
FIG. 5 is an enlarged fragmentary vertical cross sectional view showing the track driving transmission means and the clutch for drivingly connecting it to power means on the frame of the chair.

In the form illustrated, this power comprises an electric motor 83 and a power transmission mechanism 84, both supported by the main frame 1. The transmission is a reduction gear type and includes in its gear train a worm driven gear 85 rotatable with a double end output shaft 86 as best illustrated in FIG. 5. The ends of the shaft 86 are drivingly connected to clutches 87, respectively, each of which includes a driving flange 88, a driven flange 88a and a shifting ring 89, actuating one or more engagement pins. The driven flange 88a is connected to a telescopic drive shaft 90 which is co-rotatable and includes telescopic splined sections 90a, 90b, 90c, and 90d. The shaft 86 preferably is hollow to permit the sections 90a to pass thereinto a substantial distance during collapse of the shaft axially. The shaft 90 is connected at the outer end of the section 90d to the drive sprocket 81.

The sprocket 81 is secured on the section 90d for rotation therewith by a suitable means, such as the nut, illustrated. The sprocket 81 is provided with a coaxial integral bell 91. A suitable bell 92 is provided on the side frame member 2, for purposes later to be described. Each clutch 87 is shifted by a rock lever 93 which, at one end, is pivotally connected to the clutch shifting ring 89 and at the other end carries cam rollers 94 for engagement with a cam 95. The two cams 95 for the clutches 87 are fixedly connected to a common clutch cam shaft 96 which is mounted in the transmission housing for rocking about the axis of the shaft 96.

In operation the clutches are engaged concurrently and disengaged concurrently. The present chair is not dirigible when in gear except insofar as caused by tread undulation and leaning of the occupant to one side or the other. This is for reasons of safety and simplification. On level ground, except for momentary power application for passage through doors or across rough ground, the chair is hand powered with both clutches disengaged.

The cams 95 are connected by the shaft 96 and one cam is connected to a hinged clutch shaft 97 which is rockable by either of two levers 98 for rocking the connected cams and, through the shaft 96 the other cam, concurrently about the horizontal axis of the shaft 96. The levers 98 are positioned at the front and rear of chair arms so as to be accessible to an occupant of the chair or an attendant pushing the chair. The levers 98 are connected by a tie rod 99 for rocking in fixed relation to each other. When either lever 98 is rocked in one direction, it causes the cams 95 to effect engagement of the clutches 87 and when either lever 98 is rocked in the opposite direction, it causes the cams to effect disengagement of the clutches 87.

The motor 83 is a reversible, direct current motor operated by a battery so that it can readily be reversed and driven in either direction selectively by a conventional stop and reversing switch. The switch may be located on one of the arms of the chair or in any other convenient location.

In the stair climbing position the sole support of the chair is by the track 80 through the medium of the sprocket 66, bogie rollers 68, 71 and 73 and the sprocket 75. In the ground operating position, however, the support is through the wheel 60 and the portion of the track in load bearing engagement directly therebeneath, and, in addition, a single caster 100, as best illustrated in FIG. 2.

The caster 100 is supported by an upright swivel 101, having a housing 101a, midway between the side frames 2 so that the caster may swivel about a substantially upright axis. The swivel 101 is supported from the main frame 1 by means of arms 102 and 103, respectively. These arms are pivotally connected at their forward ends to the frame 1 and at their rear ends to the swivel 101, the pivotal connections being such that the arms support the caster 100 for lifting and for lowering movement to a raised idle position or to lowered ground engaging position, while maintaining the swivel axis approximately vertical. The arm 103 serves as the caster lifting and lowering arm and is provided at its forward end with a rigid crank 104 by which the arm 103 may be rocked about its pivotal axis on the frame 1.

The forward end of the crank 104 is pivotally connected to one end of a link 105. The other end of the link 105 is pivotally connected to one end of a main actuating arm 106. The main actuating arm 106 is pivotally connected to the main frame so that, upon rocking of the arm 106 in a counterclockwise direction or forwardly of the vehicle in FIG. 9, the caster 100 is raised to the idle position, and when the arm 106 is rocked in the opposite direction or clockwise the caster 100 is lowered to a ground engaging position.

It is necessary that the caster 100 be in idle position when the tracks 80 are in the stair climbing position, as illustrated in FIG. 1, and that it be lowered to a ground engaging position when the tracks 80 and wheels 60 are in ground engaging position, as illustrated in FIG. 2. Likewise, it is desirable that the various bogie rollers be shifted concurrently to their proper related positions concurrently with the movement of the caster 100 to its selected positions.

For this purpose the arm 106 is mounted on a rock shaft 107. The shaft 107 is rotatably mounted in a main frame 1 for rocking about an axis extending transversely of the main frame for rocking therewith in fixed relation thereto. The shaft 107 is coaxial with the rocking axis of the front idler arm 65. The shaft 107 is preferably hollow and similar to the shaft 86 heretofore described and is connected by suitable telescopic shafts 110 with the arms 65 for rocking the arms 65 in fixed relation to the rocking of the arm 106. The distance from the pivot of the link 105 to the shaft 107 and the length of the arms 103 and 104 are so related to the length of the arms 65 that when the arms 65 are raised to their uppermost position, as illustrated in FIG. 2, for ground travel, the caster 100 is in its fully lowered position, and when the arm 65 is lowered to its stair climbing position, as illustrated in FIG. 1, the caster 100 is in the raised idle position in which it does not engage the stairs or the ground.

In order to raise the bogie rollers 71 and 73 concurrently with the raising of the front idler sprocket 66, on the same side of the frame, the bogie arm 70 is connected by a suitable tie rod 111 to the arm 65, the points of connection of the rod 111 relative to the rocking axis of the arm 65 and the pivotal axis of the arm 70 being such that in the raised position of the idler sprocket 66 for the ground traveling, the bogie roller 71 rests lightly on the track 80. To insure that the bogie roller 71 is in proper load bearing relation to the track 80 when the bogie roller 71 is lowered to the proper stair climbing position, a suitable spring 112 is interposed between an abutment 113 on the side frame and the arm 70, this spring being a compression spring and urging the arm 70 downwardly. A suitable adjusting bolt 114 is provided for adjusting the spring relative to the weight of the occupant of the chair so that the bogie roller 71 rides properly on the track 80 to assume its share of the load.

In order to assure the like proper position of the bogie roller 73, the arm 72 is provided with a forward extension 116 which is engaged by a suitable rearward extension 117 on the arm 65. The extension 117 carries a roller 118. Thus, upon swinging of the arm 65 about its pivotal axis to raise the front idler 66 to a position illustrated in FIG. 2, the roller 118 bears downwardly on the extension 116, thus swinging the arm 72 counterclockwise in FIG. 2 and raising the bogie roller 73. Here again, as in the case of the bogie roller 71, a suitable compression spring 120 is interposed between the arm 72 and a suitable abutment 121 on the frame 2, and an adjustment bolt 122 is provided for adjusting the compression of the spring so that the bogie roller 73 assumes its proper share of the load.

Since the occupant of the chair is usually an invalid and is unable to manipulate various rollers and the caster, provision is made to drive the main actuating arm 106 by the motor 83. For this purpose, the motor gear transmission is provided with a conventional overload release clutch 125 such as a positive drive clutch with spring pressed ball detents on driving jaws which are forced to release by overloads. The clutch 125 drives a universal joint 126 which is connected to a screw 127. a follower 128 is mounted on the screw for movement therealong consequent upon rotation of the screw. The follower 128 is pivotally connected to the upper end of the arm 106 for driving the arm. Thus, by control of the direction of motor rotation, the arm 106 can be rocked in opposite directions for placing the chair in the ground travelling or stair climbing positions, selectively. The ball screw 127 is left free except for the follower 128 and universal joint 126 so that it can adjust itself to different positions as dictated by the elevation of the upper end of the arm 106. Thus, upon operation of the arm 106 in one direction, the track is placed in load bearing relation to the wheel 60 and the caster to the rear thereof is placed in load bearing relation to the ground. Upon movement of the arm 106 in the opposite direction, the track 80 is placed in load bearing relation to the stairs and out of load bearing relation with respect to the wheel, and the caster is lifted out of ground engaging position.

Referring next specifically to the track 80, the track and its operation can best be explained by reference first to FIG. 10 which is a simplified diagram illustrating the manner in which the track treads function to elevate the chair by direct downward thrust on the upwardly exposed surface of the chair treads. The track 80 functions, in effect, more or less as a cog railway through the medium of the front idlers 66, and the rear idlers 75. It is assumed for purposes of illustration that the track is sufficiently rigid between these idlers so that the bogie rollers are not required in FIG. 10.

The track 80 is in the form of an endless chain 129 having feet 130 distributed therealong. The feet are supported by pivot pins on the chain so that, along the lower portion of the path of the chain, the feet 130 hang downwardly of the chain and are freely swingable endwise of the chain about their pivotal connections.

Figure 10:
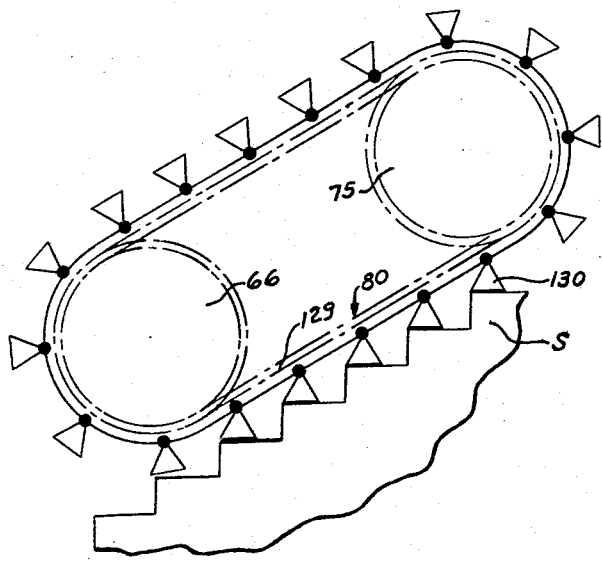
FIG. 10 is a diagrammatic side elevation of one of the endless tracks of the chair, illustrating the basic operation thereof.

Referring to FIG. 10, assuming that the chair is climbing a staircase having stair treads, the feet 130 will be lowered successively onto the upper surfaces of the stair treads and bear downwardly thereon. Thus the chair and its load are elevated by the downward thrust of the feet 130 on the treads. The feet are pivotally connected to the chain for a minimum of frictional resistance so that the feet can hang freely and assume a position in which their under surfaces or soles are horizontal.

Figure 11:
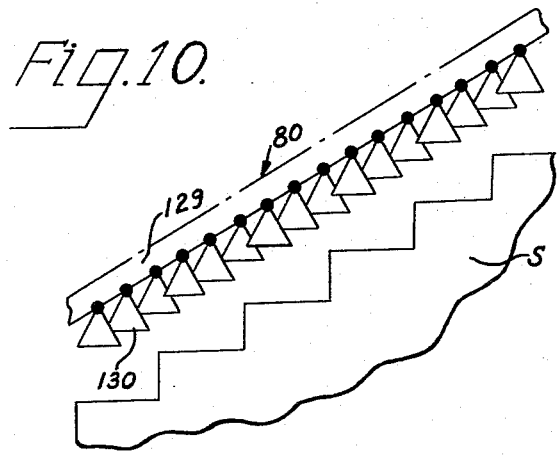
FIG. 11 is a diagrammatic side elevation of a portion of an endless track illustrating the overlapping arrangement of feet employed in the present invention in stair climbing position of the track, but with the feet unapplied to stair treads.

It must be remembered that the lower portion of the chain does not move relative to the stairs while the feet 130 are in engagement. However, the width of stair treads and the height of risers vary. Consequently, with only a limited number of feet 130, as illustrated in FIG. 10, there is a possibility that an insufficient number of feet will be in full engagement with the stair treads or that the feet might not be placed in the position needed at a given moment. Accordingly, in order to assure that there are an adequate number of feet in engagement with the treads, the feet are mounted sufficiently close together endwise of the chain so that they overlap. As illustrated in FIG. 11, they are preferably arranged in pairs, two feet of each pair being in line transversely of the chain or axially of their pivots. The pairs comprise an outer pair including one foot at each of the outer axial limits of the wheel 60, an inner pair which includes two feet placed closely adjacent and equidistant from the axial midportion of the wheel, and a middle pair which includes two feet spaced equidistantly from the axial midportion and outer axial limits of the wheel 60.

For simplicity in description, however, it is assumed that in FIG. 11 only one foot is mounted on each pivot. The feet hang from their pivots so that their treads or soles are horizontal as they approach the upper faces of the treads of the stairs.

Figure 12:
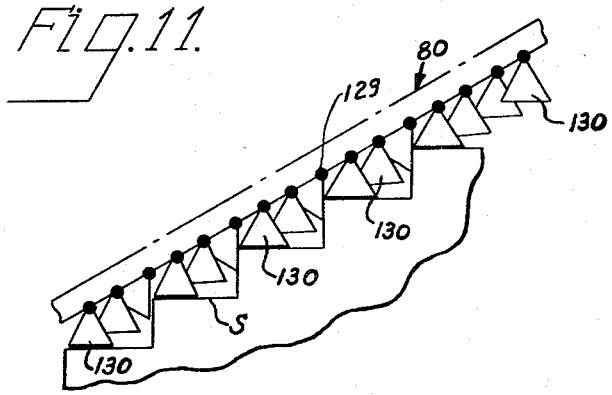
FIG. 12 is a diagrammatic side elevation, similar to FIG. 11, showing the feet in stair tread engaging condition.

As illustrated in FIG. 12, as the feet 130 reach the treads some of the feet will engage squarely and fully on the upper surface of the treads. Others will strike the riser. Still others will not engage the stairs or will engage near the forward edge or in tilted condition. It is desirable that only those fully and square in engagement with the upper surfaces of the treads be used for the present purpose and the others swing out of the way. For this purpose suitable tripper mechanisms are provided.

Referring to the feet specifically, all feet 130 are identical. As best illustrated in FIGS. 13 and 14, each foot 130 preferably comprises a body in the form of a steel stamping which is relatively rigid and weight supporting. The body is supported on an elongated pivot pin 131 on the chain by rigid sleeve bearing 132 which pivotally accommodates the pivot 131 of the chain links. The sleeves 132 are of identical lengths, but the feet are attached at any one of three positions, selectively, for disposing the feet different distances from the chain links. For example, three feet are disposed at each side of the chain, as indicated in FIG. 18. The middle foot at one side has a sleeve extending equidistantly from the plane of its body. If a foot is to be placed outermost, to the right in FIG. 18, the sleeve extends from the dotted end 132a to the plane of the foot. If a foot is innermost, the sleeve extends from the dotted end 132b to the plane of the foot.

The same general arrangement is provided for the feet to the left of the chain in FIG. 18. Each foot 130 has a tread 133 which preferably is of a relatively soft, synthetic, organic plastic, such as a polyurethane elastomer, which has sufficient rigidity to support weight yet has enough yieldability or resiliency to allow creepage in making turns and the like in the manner of a rubber tired vehicle. Each foot 130 has a sole portion 133a, which is a normal stair tread engaging surface for stair climbing. Each foot has a toe portion 133b arranged at one end of the sole portion and a heel portion 133c arranged at the other end of the sole portion. Each foot 130 is preferably provided with a counterweight 134 to assure that, when it is suspended in free condition from the lower portion of the chain, its normal position is one in which the surface 133a is substantially horizontal. Each foot 130 also has a cam portion 135 above and spaced from the pivotal axis of the bearing 132, a slot or cut-out indicated at 136, a tripper rivet receiving hole 137, a tripper spring hole 138, and a notch or cut-out 139 for tread clearance, as will later be explained. The slot or cut-out 136 is for clearance of the bearing of the next adjacent foot during swinging of the feet for accommodation to the stair treads.

For assuring that the feet 130 engage the stair treads properly and those which are not to be effective at a given time are moved out of the way so as not to interfere, trippers 140 are provided, one for each foot.

As best illustrated in FIGS. 15 and 16, each tripper is formed of a single piece of material, either by stamping or casting, but preferably molded from semi-hard polyurethane elastomer, approximately $\frac{1}{16}$ of an inch thick. Each tripper comprises a body portion 140a, an arch portion 140b at the bottom, a toe portion 140c, and a heel portion 140d.

Each tripper 140 has a clearance space, indicated at 141, for clearance of the bearing sleeve of the foot to which it is attached, and a cut-out clearance space 142 for clearing the bearing of the foot next adjacent thereto. The space between the body 140a and the toe 140c can accommodate a spring for maintaining the tripper and its associated foot in proper operating relation. The toe portion 140c may be made sufficiently heavy so as to act as a counterweight to assure that the tripper will hang with its arch portion 140b horizontal when at the bottom portion of the path of travel of the chain and unengaged by any extraneous surface. Each body has a slot 143 which slopes upwardly in a direction from the heel to the toe and which has a lower extension 143a. Each tripper has also a spring anchor hole 144.

As illustrated in FIGS. 17 and 18, each tripper is pivotally connected to its associated foot by means of a pivot 145 which is fastened in the aperture 137 of the foot and which is accommodated in the slot 143. When a foot 130 and its associated tripper 140 are hanging freely, they assume the position illustrated in FIG. 17 wherein the under surface or arch portion 140b of the tripper hangs below the sole 133a of the associated foot.

A spring 146 has one of its ends inserted in the hole 138 of the foot 130 and the other of its ends inserted in the hole 144 of the associated tripper. Self-lubricated plastic washers 148 are installed between the feet and trippers, and the tripper slots and the associated pivots are faced therewith. The feet are variously positioned lengthwise of their bearing sleeves.

In the position illustrated in FIG. 17, the spring is substantially unstressed. However, in ascending the stairs or descending stairs, it is apparent, as illustrated in FIG. 19, that some of the feet 130 can engage in proper positions on the stair tread and others cannot, but, instead, would, without the trippers, hit the stair risers or the forward edges of the treads. In such cases, the feet will be tilted. Without the trippers, some feet would engage the stair treads only with the half of their soles nearest the heels.

These precariously placed feet would then roll off the treads, allowing the whole machine to move downwardly of the stair case. Additionally, these poorly positioned feet would hold in elevated position other feet which would otherwise be well positioned for full contact with the stair treads. It is to move these misplaced feet out of the way that the trippers are provided. As mentioned, the slots 136 provide clearance for the bearings 132 of the adjacent feet.

Referring to FIGS. 21 and 22, there is shown in FIG. 21 a foot 130 and its tripper 140 approaching a stair tread so that it is in a condition in which the foot sole 133a will engage the stair tread properly. It should be noted that in this position the under surface of the tripper 140 first strikes the tread, then as the foot continues lowering, the pivot 145 migrates downwardly in the slot in the tripper 140, compressing the spring 146. The tripper does not interfere in any manner with the proper engagement of the foot 130 and the stair treads. On the other hand, as illustrated in FIG. 23, a foot is shown as approaching the stair tread in such a manner that the foot sole 133a will not seat properly. Instead, without the benefit of a tripper, the heel 133c of the foot would strike the riser. But the heel 140d of the tripper strikes the riser or forward edge of the tread of the stairs, and through the medium of the spring 146, swings the foot 130 out of position so that it will not engage the riser or tread.

In FIG. 24, a foot 130 is approaching a stair tread in a manner such that it will engage the forward edge of the tread. However, since the tripper 140 always leads in the direction of approach, the heel arch of the tripper 140 engages the tread and thereby, by the stiffness of the spring 146, forces the foot 130 to a rocked position, as illustrated in FIG. 24, wherein it will not be in load bearing contact to the stair tread.

It is to be noted that in comparing FIGS. 21 and 22, the pivot 145 has migrated along the slot substantially in the direction of approach of a foot to the stair tread so the tripper causes no appreciable rotational movement to the shoe even though the spring 146 is compressed. However, as illustrated in FIGS. 23 and 24, this is not the case, the tripper swinging about its pivot 145 instead. Thus, instead of the pivot moving along the slot 143 of the tripper, the tripper swings the foot 130 rather than merely adjusting itself to it.

Figure 26:
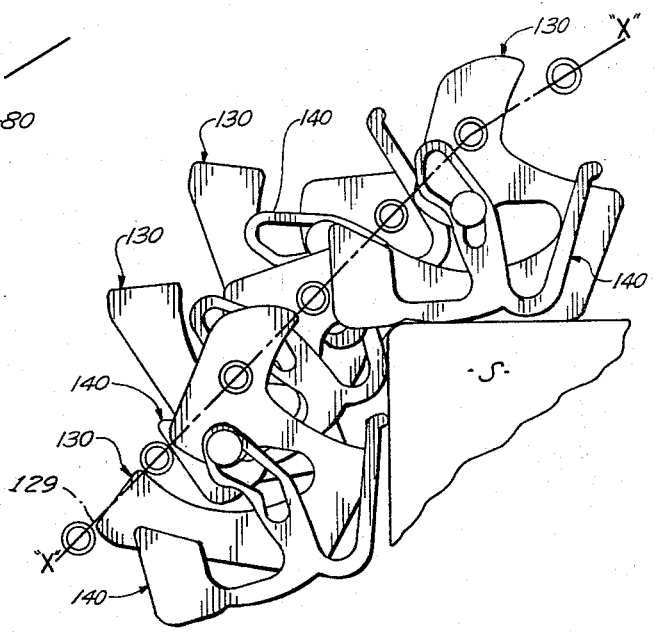
FIG. 26 is a composite side elevation of four feet and associated trippers showing typical cooperative relations thereof with a stair tread.

Referring next to FIG. 25, a foot and tripper are shown approaching a stair tread in such a position that there will not be full support of the foot sole and stair tread. As mentioned, the tripper engages before the foot and the tripper joint buckles, because of the non-linear shape of the slot 143, but the tripper meanwhile swings the foot out of position. In FIG. 26 there is shown a composite of four feet 130 with trippers 140, and their relation to a stair tread raiser. Here it can be seen, by virtue of the cooperation of the trippers and their associated feet, the sole of each foot will fully and squarely engage the upper face of the tread or the foot will be moved out of the way so as not to interfere with the operation of those feet which do properly engage the tread.

The feet 130 approach the treads in approximately the path indicated in the drawings whether the machine is ascending or descending the stairs. Thus FIG. 23 shows how the foot is tripped by the tripper if any part of the tripper heel contacts the edge of a step tread or riser. FIGS. 24 and 25 show how the foot is tripped by the tripper if the tripper arch or sole contacts the edge of the step.

It is noted that in FIG. 26 the foot at the right is properly seated. The foot second from the right has been tripped by its tripper nearly to an extreme position. The tripper for the third foot from the right has engaged the forward edge of the step with its heel and partially rolled off the top of the step onto the riser, holding its associated foot out of contact with the stairs. The foot at the left had been tripped sufficiently to clear the stair riser, should the riser be that close to the forward edge of the stair tread. The heel of the tripper is high enough with respect to the tread-tripper shoulder rivet that it will readily "stub" itself on the surface of the riser.

It is to be noted also that in FIG. 26 there is a considerable degree of chain undulation, as indicated by the line X—X through the foot pivots, and that the foot and tripper assemblies have to allow for it. When each foot and tripper reaches its position, as shown to the left and second from the left in FIG. 26, the force acting on the tripper is predominantly horizontal, thereby pressing the tripper against the riser.

It is important that while precise placement of a foot upon a step is not required, any load bearing foot should reach the stair tread with its sole reasonably horizontal so that the foot seats upon the stair tread with negligible rocking or creepage.

Figure 27:
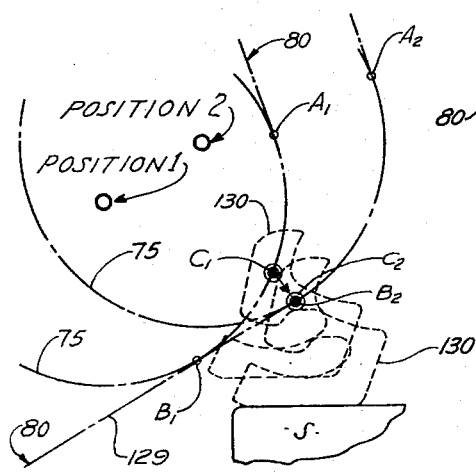
FIG. 27 is a diagrammatic side elevation showing the approach of a foot to a stair tread, at the rear idler sprocket of a track, the trippers being omitted.

FIG. 27 shows schematically the operation of the track 80 as it rounds the rear idler sprocket 75 as the chair is ascending the stairs. From this showing, it will be apparent that the track moves downwardly nearly vertically from the drive sprocket to point $A_1$ or $A_2$. However, at the same time, the whole chair is moving horizontally. This produces a compound motion. Of course, the track 80 is not moving where it is parallel to the slope of the stairs, that is, from the points $B_1$ or $B_2$ to the front idler sprocket 66. Instead, it rests in fixed position on the stairs. As the chair ascends, the axis of the rear idler sprocket 75 moves from position 1 to position 2, and point $C_1$, representing a chain pin at the sprocket pitch line, with an attached foot 130, moves to the position of $C_2$, describing the path shown.

Figure 28:
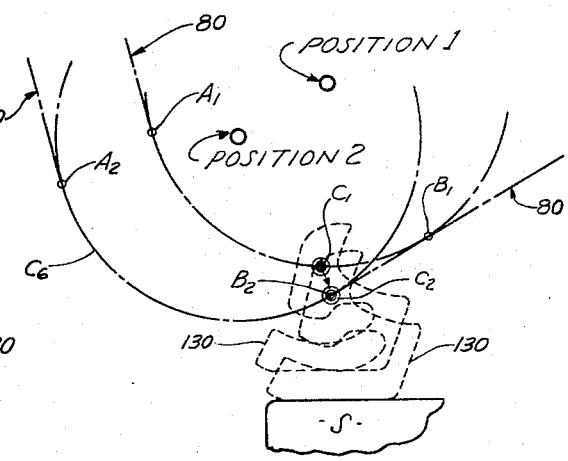
FIG. 28 is a diagrammatic side elevation similar to FIG. 27, showing the approach of a foot to a stair tread at the front idler sprocket of a track.

FIG. 28 shows in schematic form the operation of the track 80 as it rounds the front idler sprocket below and in front of the chair. Again, it is obvious that the track moves vertically between the main wheel and points $A_1$ or $A_2$. However, at the same time, the chair is moving horizontally, thus producing a compound motion. The chain is not moving where it is parallel to the slope of the stairs, that is, from the point $B_1$ or point $B_2$ or to the rear idler sprocket. As the chair descends the stairs, and the front idler sprocket axis moves from position 1 to position 2, point $C_1$, representing the chain pin at the sprocket pitch line, with the attached foot moves to position $C_2$, traveling in the path shown.

The distance horizontally that a foot moves from the time that the tripper contacts the stair tread until the foot is fully placed on the step may be termed "preplacement." The initial position of the foot is not the final position. This preplacement must be neutralized in the opposite direction which can be termed "counter preplacement." The slope angle of the stairs is the primary factor in determining the amount of preplacement. The preplacement angle, or basic tripper slot angle, is exactly 90° to the slope angle of the stairs. Preplacement is effected by the amount of vertical action required of the tripper. A secondary factor is the size of the front and rear idler sprockets, larger sprockets producing less secondary effect, that is less difference between front and rear preplacement. By design of the tread so as to require less vertical tripper action, the tracks function on a lower portion of the front and rear preplacement curves, where they more nearly coincide. Increasing the vertical action results in increasing preplacement at the rear sprocket, but at an accelerating rate, and increasing the vertical action results in decreasing the preplacement at the front sprocket but at a decelerating rate.

The tripper action required is generally determined by the design of the foot, that is, the difference in distance between the tripper rivet to the sole and the tripper rivet to the heel. Steeper stairs produce more preplacement.

Figure 29:
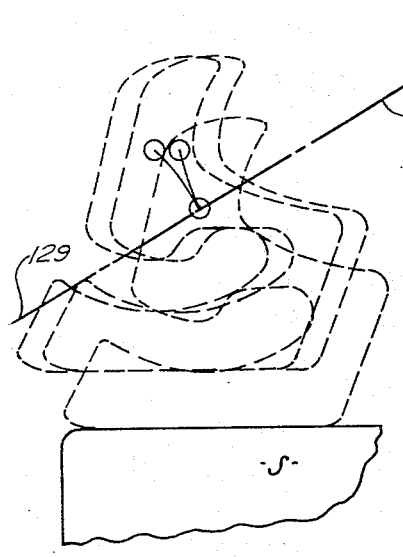
FIG. 29 is a diagrammatic illustration showing the differences in the approach of the feet at the front and rear idler sprockets respectively the tripper being omitted for clearness in illustration.
Figure 30:
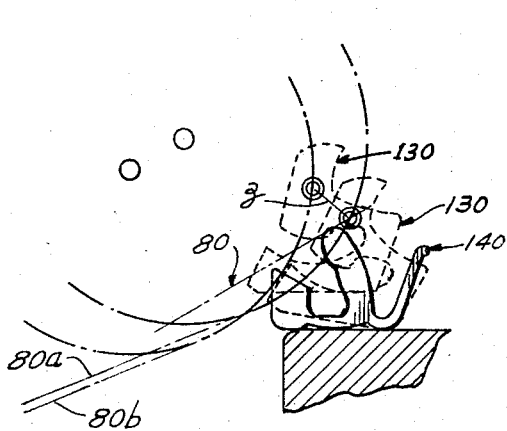
FIG. 30 is a diagrammatic composite side elevation showing a single foot being applied to a stair tread and illustrating the effects of undulation of the endless track at the rear of the chair.
Figure 31:
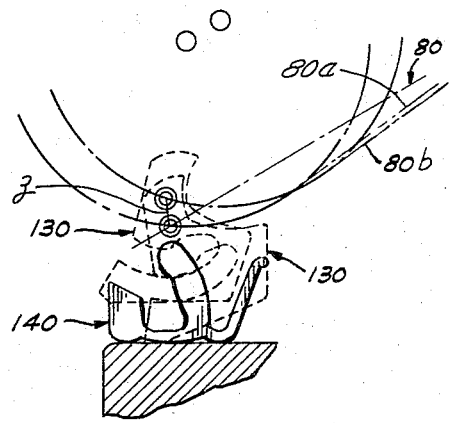
FIG. 31 is a view similar to FIG. 30 illustrating the effect of undulation upon preplacement at the front of the stairs.

The size of the front and rear idler sprockets also have an effect. Increasing the diameter of the front idler sprocket increases the preplacement. Increasing the diameter of the rear idler sprocket reduces preplacement. Ideally, perhaps, the sprocket sizes should be increased to the point where the front and rear preplacement approach equal value. The composite of the preplacement is illustrated in FIG. 29. As mentioned, the chain tends to undulate at the portions directly transferring load to the stair treads, and this undulation is illustrated in FIG. 30 and FIG. 31 which show how the tripper and foot contact the steps at higher points on the sprocket pitch line than the theoretical position shown, for example, as in FIG. 28. This results in more preplacement at the rear and less at the front. The amount of undulation, of course, is determined by the load on the chain and stiffness of the chain supporting and tensioning springs. Generally, the springs are adjusted for an occupant of about 150 pounds.

There are three means by which the counterpreplacement can be obtained. First, the foot can be counterweighted so that its natural position while hanging free is somewhat toe down. Second, the tripper can be so balanced that it hangs toe down to some extent. Third, the tripper slot can be placed at an angle which produces the needed amount of horizontal movement. The third method appears to be most desirable because the pressure on the foot and tripper assembly is opposed by the spring remains for the most part essentially straight downward. It is to be noted that the slot 143 in the tripper 140 is not straight but curved so that it aids in the buckling action, such as is shown in FIG. 25. A slot that too accurately counterpreplaces the foot might prevent dependable buckling in that the downward pressure from the foot bearing through the tripper rivet to the point of tripper contact with the step might remain rather a straight line.

The square engagement of the foot soles by cooperation of the trippers and feet has a very distinct advantage in that, if weight were applied to a foot while its sole was tilted relative to the surface of the tread, then the foot would tend to rock either forwardly or rearwardly to adjust itself properly to dispose its sole in horizontal position on the stair tread. This would cause creepage of the track forwardly or rearwardly along the stair treads, thus interfering with the proper engagement of those foot soles which did engage the treads initially in a proper horizontal and full contact position. The desirability of proper placement of the feet becomes apparent when it is realized that there are approximately two hundred feet, each with a tripper and that several feet on each chain are simultaneously engaging the steps.

The undulation of the chain will alternately bring the feet closer together and then spread them apart while they are on the stairs. This will be only a small fraction of an inch, but it will help to seat more firmly any foot not precisely placed. Also undulation provides a means for steering. By leaning to one side or the other, the undulation on the side to which the occupant leans is increased. This effectively shortens the distance between the feet placed upon adjacent steps. At the same time, the distance between feet at the opposite side is effectively lengthened. Thus the chair can negotiate slight curves and the like.

As shown in FIGS. 30 and 31 the undulation produces a secondary effect by causing the feet to engage the steps heel first while ascending and toe first while descending.

FIG. 30 shows the effect of undulation on preplacement at the rear. FIG. 3 shows the effect at the front. In these figures the approximate position of the pitch line of the track 80, without undulation, is shown by the dot-dash line. The pitch lines resulting from undulation are indicated at 80a and 80b. The approach path as increased by undulation is indicated at z.

As the feet approach the drive sprocket 81, and make a short radius turn thereabout, they must be kept outside of the chain pitch line. This is because of the small diameter of the sprocket which would cause the toes of the feet to interfere with the bearings of adjacent treads and jam the mechanism.

In order to retain the feet 130 and trippers 140 in proper relation as the track 80 passes over the drive sprocket, the drive sprocket has a coaxial bell 91 and the side frame has a partial bell 92 coaxial with the bell 91. A lead ramp 152 is mounted on the side frame 2 in advance of the bells. The partial bell is contiguous to the lead ramp 152 and is sufficient to keep the feet in their outward position for nearly a quarter of a turn around the drive sprocket. While it would be possible to provide a drive sprocket with two bells, the construction described is space saving and permits a smaller folded width of the chair.

The ramp moves the feet outwardly when the chair is travelling backwardly. The ramp may be covered with any one of several proprietary dry lubricant plastic films cemented or otherwise fastened to it.

The bells 91 and 92 keep the toes of the pairs of feet near or outside, but not materially inside, the chain pitch line, whether the chair is travelling forwardly or rearwardly.

Another refinement resides in the counterbored thrust washers 153 of self-lubricating plastic material, shown in FIG. 18. One of these washers, with a retaining ring 154 within the counterbore, is used to retain each foot on its pivot pins and serves as a thrust washer for the foot. Also it protects the ends of the chain pivot pins and helps guide the track assembly between the flanges of the main wheel and partially protects furniture and doorways during operation.

*Caster*

A further refinement resides in the specific structure of the caster 100. The caster comprises triangular plates 155 in spaced face to face relation on which a main roller 156 and two idler rollers 157 are mounted for rotation about parallel axes. An endless flexible runner and fabric belt 158, which may have low relief, or any suitable tread surface 159, extends about the rollers. Auxiliary rollers 160 are disposed between the roller 156 and the rollers 157 and are positioned close to the belt so as to engage it in force transmitting relation when the belt strikes a curb or stair.

The plates 155 are connected near their top edges to a swivel fork 161 of the swivel 101, for rocking about a horizontal axis by a pivot 162. The fork carries a pin 163 which is parallel to the pivot 162 and which is movable along an arcuate slot 164 concentric with the pivot 162.

A tension spring 165 is located between plates 155 and connected at one end to the plates 155, respectively, and at the other end to the pin 163 and urge the plates to swing about the pivot 162 counterclockwise in FIGS. 2 and 8. In this position, the wheel 156 is disposed to the rear of the swivel axis when the chair moves forwardly.

The forward portion of the belt slopes upwardly forwardly about 45° from the roller 156. Hence the caster can readily ride up over curbs which the chair approaches forwardly. This angle of the belt gives equivalent performance of a caster wheel of a diameter of about four times the height of a curb engaged, to a maximum height not exceeding the height of the wheels 157.

The position of the roller 156 rearwardly of the swivel axis assures proper trailing alignment of the caster 100. If the chair is moved down a step or curb, the caster will roll over the curb and the point of contact, and hence pressure, between the caster and curb, will be at the rear of the caster instead of the lowermost portion thereof. The spring 165 then permits the plates 155 to swing clockwise about the pivot 162 in FIGS. 2 and 8 to their position in FIG. 8a wherein the pin 163 travels to the other end of the slot 164 and the roller 156 is thereby at the opposite side of the swivel axis and hence does not cause the caster to whip about the swivel axis.

If the caster should be such that this reversed position of roller and swivel axis cannot be maintained beyond the midheight of the belt on the trailing side, a latch or restraining means can be employed to assure positive positioning. Thus, when the plates 155 swing clockwise, they may be prevented from swivelling so long as the pressure upon the trailing side of the belt is sufficient to overcome the spring. The result is that the caster, at first, has no urge to swivel, and later is prevented from swivelling until the caster has fairly well completed its travel off the curb down to the lower lever.

On the other hand, a standard caster, as it whips, would produce a jolting drop uncomfortable to the occupant.

When the chair climbs a curb going forward, as the main wheels go up the curb, the caster swivel becomes no longer vertical. The weight of the chair causes the caster to rock, and the caster is thereby reversed. This is apparent from FIG. 8a assuming the caster is rotated about 30° clockwise.

By normal act of backing the chair against the stairs prior to raising the caster, the caster can be swivelled to the position illustrated in FIG. 9 and thus brought close to the main frame 1 in the idle position of the caster.

The latch or restraining device may comprise a locking pin 166 pivotally mounted on one of the plates 155 by a pivot 167 for swinging in a vertical plane to the plates 155. A guide bearing 168 for the pin is mounted on the swivel fork 161 and guides the pin 166 for axial movement. A latch plate 169 is mounted on the swivel housing 101a and has a latching aperture 170. The entrance end of the aperture is flared outwardly in a direction toward the end of the pin 166 and the upper end of the pin is rounded for ease in entry of the pin into the aperture. Thus, when the force directed by a curb or stair against the rear of the caster rocks the caster clockwise, in FIGS. 8 and 8A, the pin enters the aperture and prevents swivelling of the caster. Consequently, even though the point of application of the force is to the rear of the pivot 162, the caster cannot whip about its swivelling axis.

In the raised position, the pitch of the fork 161 and swivel 101 is not vertical. The caster itself is unbalanced to additionally encourage the position shown in FIG. 9. Tipping of the swivel axis also causes the caster belt along the longest sides of the plates 155 disposed most nearly downwardly in FIG. 9, to assume a position substantially parallel to the pitch line of the chain and hence parallel to the rise of the stairs. Thus, while retracted, it is in the most space saving position. The unbalance of the caster tends to hold it in a fore and aft position relative to the chair and assures the best clearance from the side frames while the chair is being folded.

Figure 32:
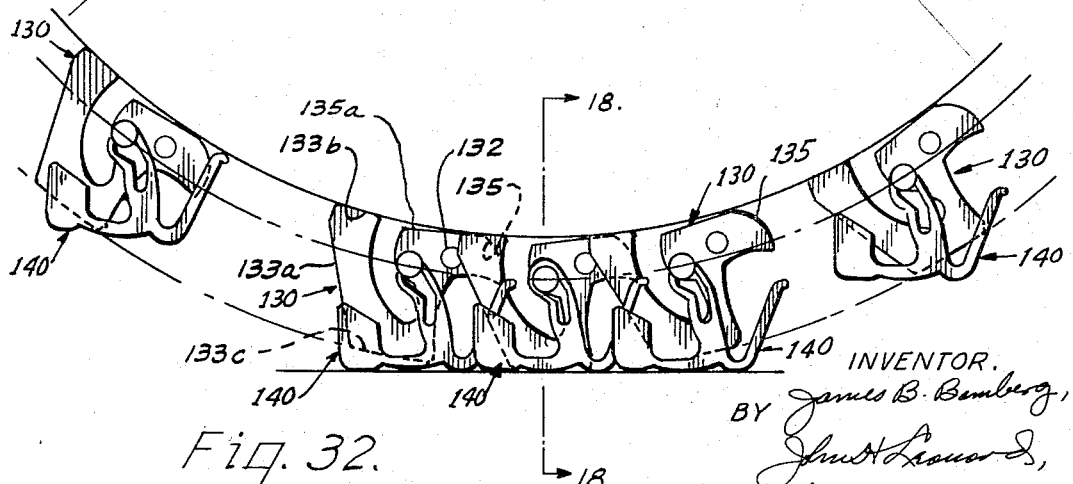
FIG. 32 is a diagrammatic side elevation of a main wheel and track of the chair showing the cooperation of the feet and wheel in ground travelling position.

Referring to FIGS. 2 and 32, it is apparent that in the ground operating condition, the chair is supported at the front by the wheels 60 riding on the tracks 80 at a location directly below the axis of the wheels, and for a short distance forwardly and rearwardly of this location, and at the rear by the caster.

However, in this condition, the track does not operate in its usual manner but instead its feet 130 are disposed so that they provide substantially only a tire about the lowest quadrant of the wheel 60.

This positioning of the feet is effected by engagement of their cam positions 135 with the rim of the wheel 60 which causes the feet to pivot about their pins 131 until the toes 133b engage the rims of the wheel. This disposes the heels 133c of the feet outermost and tangent to a circle coaxial with the wheel and greater in diameter by the distance between a heel 133c and toe 133b.

Thus the tracks 80 temporarily act, in effect, as tires for the wheels 60. Preferably the side frames carry guards 166 overlying the track 80 where it passes along the upper portion of its path.

From the foregoing it is apparent that the chair is effective for its intended purposes, and the problem generally confronting the user of such chairs have been, to a great extent, anticipated and a structure providing a solution incorporated.

Having thus described my invention, I claim:

1. A stair climbing wheel chair comprising a frame;
a pair of coaxial wheels mounted on the frame and arranged at opposite sides thereof, respectively;
endless tracks at opposite sides of the frame, respectively;
series of rollers on the frame arranged one series at each side thereof;
each wheel and the series of rollers on the same side of the frame as such wheel being in rolling engagement with the inner periphery of the track on said same side of the frame and guiding the associated track for travel along selected closed paths, respectively;
roller supporting means for the series of rollers, respectively, said roller supporting means being mounted on the frame and supporting the rollers for movement (a) downwardly, relative to the wheels, to a lowered stair climbing position wherein the rollers are in load bearing relation to the tracks and hold the wheels out of load bearing engagement with the tracks, and position the tracks so that the lower portions of the tracks travel along parallel paths which extend endwise of the frame and are inclined upwardly in a direction from front to rear of the frame and (b) upwardly, relative to the wheels, to a raised position wherein the rollers position the tracks so that the wheels are in load bearing engagement with the inner peripheries of the lower portions of the tracks and the lower portions of the tracks engage the ground beneath the wheels and are inclined upwardly from front to rear of the frame rearwardly of the wheels so that the portions of the tracks engaged by the rollers are out of load bearing relation to the ground;
roller positioning means for operating the roller supporting means for moving the rollers to, and for holding the rollers in, said lowered and raised positions, selectively;
a caster on the frame rearwardly from said wheels;
caster supporting means carried by the frame and supporting the caster for movement to a raised idle position and to a lowered ground engaging position, respectively;
caster positioning means drivingly connected to the caster supporting means for moving the caster to, and for holding the caster in, said raised and lowered positions, selectively;
track driving means drivingly connected to the tracks, respectively, for driving the tracks relative to the frame along the selected paths, when the track driving means are driven;
power means carried by the frame;
and track driving transmission means for selectively drivingly connecting and disconnecting the power means and track driving means.

2. A structure according to claim 1 wherein roller positioning power transmission means are carried by the frame and are operable, selectively, to drivingly connect and disconnect the power means and roller positioning means.

3. A structure according to claim 1 wherein means are provided for moving the caster to raised idle position upon movement of the rollers to lowered position and to move the caster to lowered position upon movement of the rollers to raised position.

4. A structure according to claim 1 wherein said frame includes a central longitudinal main frame and two side frames at opposite sides thereof, means interconnect the side frames and main frame for movement of the side frames concurrently laterally of the main frame toward the main frame and toward each other to retracted positions and away from the main frame and away from each other to extended positions, means interconnect the main frame and side frames for effecting said movements of the side frames, selectively;

said wheels are mounted on the side frames, respectively, for movement therewith to said positions; said roller supporting means are connected to the side frames, respectively, for movement therewith to said positions and for said movement relative to the side frames vertically and horizontally in all extended and retracted positions of the side frames.

5. A structure according to claim 4 wherein the roller positioning means includes a rocker arm mounted on the main frame for swinging about an axis parallel to the axis of the wheels, the roller supporting means are connected to the side frame members, respectively, for rocking about horizontal axes, and splined telescopic members interconnect the rocker arm and roller supporting means for rocking of the roller supporting means upon rocking of the arm.

6. A structure according to claim 4 wherein a flexible seat is connected at its lateral margins to the side frames;

link means, pivoted to the main frame, connect the side frames to the main frame for movement to said extended and retracted positions;

said seat, in the partially retracted position of the side frames, rests on some of said links; and said last mentioned links are of spring steel which have upwardly exposed flat faces engaging the underside of the seat and which are resiliently flexible flatwise.

7. A structure according to claim 4 wherein the power means are a motor mounted on the main frame;

the driving means comprise sprockets mounted on the side frames, respectively, and in driving engagement with the tracks, respectively;

a track driving transmission means is provided for drivingly connecting and disconnecting the motor and driving means, selectively; and said track driving transmission means includes extensible and contractible means for maintaining the connection of the track driving transmission means and sprockets in all extended and retracted positions of the side frames.

8. A structure according to claim 7 wherein the extensible and contractible means are splined telescopic shafts.

9. A structure according to claim 1 wherein said caster comprises an upright caster frame;

the caster supporting means includes a swivel supported and guided for swivelling about a swivel axis extending generally upwardly and downwardly;

means connect the caster frame to the swivel for turn about the swivel axis, the caster further includes an endless caster track, rollers mounted on the caster frame for rotation about a horizontal axes, respectively, extending transversely of the caster frame, and arranged in radially spaced relation to each other in a row extending about the caster frame; and said rollers are in rolling engagement with the inner periphery of the caster track.

10. A structure according to claim 9 wherein pivotal means connect the caster frame to the swivel for rocking relative to the swivel about a horizontal axis extending parallel to the roller axes, one of the rollers on the caster frame is disposed lowermost and is at the bottom of the caster frame for load bearing relation to the ground;

means interconnect the swivel and caster frame to limit the maximum rocked positions of the caster frame to those wherein the pivotal axis of said lowermost roller is at opposite sides of, and spaced from, the swivel axis.

11. A structure according to claim 1 wherein some of said rollers for each track are idler sprockets.

12. A structure according to claim 11 wherein resilient means yieldably bias at least one idler sprocket of each track generally endwise of the frame for maintaining the associated track under tension.

13. A structure according to claim 1 wherein each of said tracks comprises an endless chain, a plurality of supporting feet are distributed along the chain and are pivotally connected to the chain by pivots extending transversely of the frame, and the supporting feet are connected to the chain for depending and free swinging relation to the chain as they pass along the lower portion of the path of the chain, and each foot has a load bearing tread which, in the depending position, is normally horizontal.

14. A structure according to claim 13 wherein each foot tread extends endwise of the associated chain and its load bearing surface comprises a sole surface adapted for engaging the upper face of a stair tread, a toe surface at one end of the sole surface, and a heel surface at the other end of the sole surface;

the wheel associated with the chain has a rim;

cam means are provided on the feet, respectively, and are cooperable with the rim, in load bearing position of the wheels, as the feet pass into position beneath the wheels, for swinging the feet about their pivots to dispose their toe portions against the wheel rim and their heel portions generally concentric to, and spaced below, the rim; and said feet are spaced circumferentially of the wheel so that a plurality of successive heel portions are concurrently beneath the wheel in ground engaging position and are substantially tangent to a cylindrical surface coaxial with, and of greater radius than, the associated wheel.

15. A structure according to claim 13 wherein the feet are in overlapping relation to each other laterally of the frame.

16. A structure according to claim 13 wherein tripper devices are connected to the feet, respectively, each for swinging movement, relative to its associated foot, in a plane normal to the pivotal axis of the associated foot and for limited guided bodily movement relative to its associated foot in said plane;

each tripper device normally, along said lower portion of said path, is disposed, when unengaged by an extraneous surface, with its lowermost surface below the level of the bottom of the tread of its associated foot and its forward surface forwardly of its associated foot in the stair climbing direction; and resilient means interconnect each tripper device and its associated foot for moving the foot out of the stair tread engaging position when the foot approaches the upper surface of a stair tread in a relation in which the bottom of the foot would initially engage the stair tread surface substantially out of parallelism therewith.

17. A structure according to claim 13 wherein the links of the chains are connected by elongated pivots, and said feet are arranged in groups, each group comprising a plurality of feet mounted on the same pivot.

18. A wheel chair comprising a main frame;

a pair of coaxial wheels mounted on the main frame and arranged at opposite sides thereof, respectively;

caster means on the main frame and comprising an upright caster frame, a swivel carried by the main frame for swivelling about a swivel axis extending generally upwardly and downwardly, and means connecting the caster frame to the swivel for turning about the swivel axis;

an endless caster track;

rollers carried by the castor frame for rotation about horizonal axes, respectively, and arranged in spaced relation to each other in a row extending about the caster frame, and in rolling engagement with the inner periphery of the caster track;

said track being inclined forwardly and upwardly along the forward portion of its path from the level of the bottom of the wheels to a level below, and near to, the axis of the wheels;

means connecting the caster frame to the swivel for rocking of the caster frame relative to the swivel about a horizontal axis extending parallel to the roller axes, one of the rollers on the caster frame being disposed lowermost and being at the bottom of the caster frame for load bearing relation to the ground; and means interconnecting the swivel and caster frame to limit the maximum rocked positions of the caster frame to those wherein the pivotal axis of said lowermost roller is at opposite sides of, and spaced from, the swivel axis.

19. The chair according to claim 18 wherein means are provided for latching the caster frame against rotation about the swivel axis and for releasing the frame for rotation about the swivel axis, selectively.

20. A chair comprising a rigid main frame, side frames connected thereto for movement laterally of the main frame relative to the main frame and to each other to extended and retracted positions;

rotatable supporting means connected to the side frames, respectively, in load bearing relation to the side frames and for rotation about axes extending transversely of the frames;

means operable for rotating the rotatable supporting means, respectively;

means to move the side frames to said positions selectively, said last mentioned means including reversible toggle means drivingly connected to the side frames and operable to move the side frames toward extended and retracted positions when the toggle means are driven in opposite directions, respectively;

a dead center spring drivingly connected to the toggle means, and manual means to shift the spring from one side of dead center position to the opposite side of dead center position, selectively, and thereby to yeildably drive the toggle means by the spring in said opposite directions, respectively.

21. The structure according to claim 20 wherein said means to move the side frames to said positions also includes means, in addition to the toggle means, drivingly connected to the side frames and operable for applying additional force to the side frames directed so as to move the side frames in the extending direction to fully extended position.

References Cited by the Examiner

UNITED STATES PATENTS

| | | | |
|---|---|---|---|
| 2,765,860 | 10/1956 | Church | 180—9.24 X |
| 3,166,138 | 1/1965 | Dunn | 180—9.24 |
| 3,231,036 | 1/1966 | Appenrodt | 180—9.22 X |

FOREIGN PATENTS

| | | |
|---|---|---|
| 1,363,987 | 5/1964 | France. |
| 584,078 | 1/1947 | Great Britain. |
| 693,983 | 7/1953 | Great Britain. |

BENJAMIN HERSH, *Primary Examiner.*

R. J. JOHNSON, *Assistant Examiner.*